United States Patent
Nitou

(10) Patent No.: US 7,154,384 B2
(45) Date of Patent: Dec. 26, 2006

(54) VEHICLE THEFT PROTECTION SYSTEM, A METHOD OF PROTECTING A VEHICLE FROM THEFT, A VEHICLE-ONBOARD DEVICE, A MANAGEMENT STATION, AND A PROGRAM FOR PROTECTING A VEHICLE FROM THEFT

(75) Inventor: Hiroaki Nitou, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 10/760,740

(22) Filed: Jan. 20, 2004

(65) Prior Publication Data

US 2005/0116816 A1    Jun. 2, 2005

(30) Foreign Application Priority Data

Jan. 21, 2003    (JP) .............................. 2003-012281

(51) Int. Cl.
*B60R 25/10* (2006.01)
(52) U.S. Cl. ........................... 340/426.16; 340/426.17; 340/539.16
(58) Field of Classification Search ............. 340/425.5, 340/426.1, 426.13, 426.14, 426.15, 426.16, 340/539.16, 539.17, 539.23, 901, 905, 928, 340/426.17; 341/50, 106
See application file for complete search history.

(56) References Cited

U.S. PATENT DOCUMENTS

| | | | | |
|---|---|---|---|---|
| 6,087,963 A | * | 7/2000 | Kobayashi et al. | 340/928 |
| 6,288,675 B1 | * | 9/2001 | Maloney | 342/457 |
| 6,380,848 B1 | | 4/2002 | Weigl et al. | 340/426.1 |
| 6,417,781 B1 | * | 7/2002 | Matsumoto | 340/901 |
| 6,608,567 B1 | * | 8/2003 | Matsumoto | 340/905 |
| 6,621,425 B1 | * | 9/2003 | Maeda | 341/50 |
| 6,681,157 B1 | * | 1/2004 | Kageyama | 701/1 |

FOREIGN PATENT DOCUMENTS

| | | |
|---|---|---|
| DE | 44 13 922 | 10/1995 |
| DE | 44 42 103 | 5/1996 |
| DE | 100 46 698 | 5/2002 |
| FR | 2 842 484 | 1/2004 |
| JP | 62-158963 | 10/1987 |
| JP | 04-361464 | 12/1992 |
| JP | 11-155026 | 6/1999 |
| JP | 2001-341618 | 12/2001 |
| JP | 2002-211361 | 7/2002 |
| JP | 2002-216256 | 8/2002 |
| JP | 2002-342897 | 11/2002 |
| WO | 99/08909 | 2/1999 |
| WO | WO 00/61407 | 10/2000 |

OTHER PUBLICATIONS

German Office Action dated Apr. 26, 2005 with English translation.

* cited by examiner

*Primary Examiner*—Van T. Trieu
(74) *Attorney, Agent, or Firm*—Katten Muchin Rosenman LLP

(57) ABSTRACT

A vehicle theft protecting system includes a vehicle-onboard device mounted on a vehicle and a management station installed at a predetermined location, each including narrow area wireless communication unit capable of communication with encryption in a range of a predetermined distance to perform regular mutual communication to monitor each other's condition. The vehicle-onboard device and the management station effect mutual verification through the narrow area wireless communication at start of the mutual communication.

40 Claims, 24 Drawing Sheets

VEHICLE THEFT PROTECTION SYSTEM, A METHOD OF PROTECTING A VEHICLE FROM THEFT, A VEHICLE-ONBOARD DEVICE, A MANAGEMENT STATION, AND A PROGRAM FOR PROTECTING A VEHICLE FROM THEFT

BACKGROUND OF THE INVENTION (1) Field of the Invention

The present invention relates to a vehicle theft protecting system for detecting an action such as stealing a vehicle and thieving goods in a vehicle, protecting from such an action, and effecting a countermeasure against such an action. Further, the present invention relates to a vehicle-onboard device mounted on a vehicle and management station at a parking area for vehicle theft protection. Furthermore, the present invention relates to a method of protecting a vehicle from theft and a related program used for such a system.

(2) Description of the Related Art

At parking areas where the public is allowed to enter, there are dangers of encountering stealing a vehicle and theft in a vehicle. Further, even at a parking area where only limited persons (contract customers) are allowed to enter, there are also dangers of encountering stealing a vehicle and theft in a vehicle unless a protection system is provided to prevent unknown persons from entering such areas. In view of the above-described circumstances, systems have been required to provide a high security capable of protecting vehicles at a parking area from vehicle theft and theft in a vehicle. Thus, various vehicle theft protection systems have been proposed.

For example, Japan se Laid-Open patent application publication No. 2002-216256 discloses a security system for parking areas in which a vehicle security system mounted on a vehicle cooperates with a ground security system installed at the parking area to protect the vehicle from theft. According to this security system for parking areas, when a vehicle with the vehicle security system is parked in a parking area with the ground security system, a wireless link is formed therebetween. In this condition when an error, for example, a strong vibration, occurs, the vehicle security system detects this and transmits an error detection signal to the ground security system through wireless communication using the wireless link. On reception of the error detection signal, the ground security system informs a mobile communication terminal, for example, a portable telephone, previously registered as an emergency notified station or starts taking an image of the vehicle with a monitor camera.

Further, Japanese Laid-Open patent application publication No. 2002-342897 discloses a parking area managing system. FIG. 1 illustrates a general structure of this parking area management system.

In FIG. 1, the parking area management system comprises vehicle-onboard communication unit 35 mounted on a vehicle, gate unit 33, center control unit 34, and ground communication unit 36 installed in a parking area. Center control unit 34, gate unit 33, and ground communication unit 36 are communicable with each other.

Vehicle-onboard communication unit 35 comprises card reader 21, card attachment/detachment detection unit 22, theft monitor setting unit 23, device ID unit 25, wireless communication unit 26, and control unit 24 for controlling operations of these units. The card reader 21 reads individual information from ID card 20 and transmits it to control unit 24. Card attachment/detachment detection unit 22 detects attachment and detachment of ID card 20 in card reader 21 and informs control unit 24 of the detection result. Theft monitor setting unit 23 is a switch for setting a theft monitor function operative or inoperative. A user can set or release the theft monitor function by turning on and off this switch. Device ID unit 25 stores an identification code of the vehicle-onboard communication unit 35. Wireless communication unit 26 effects wireless communication with ground communication unit 36 through antenna 27.

Ground communication unit 36 comprises network communication unit 28, ID collation unit 29, wireless communication unit 31, and control unit 30 for controlling operations of these units. Network communication unit 28 provides mutual communication with center control unit 34. Wireless communication unit 31 effects wireless communication with vehicle-onboard communication unit 35 through antenna 32. ID collation unit 29 collates the identification code of device ID unit 25 transmitted from vehicle-onboard communication unit 35.

In the above-described parking area management system, it is assumed that a user parks a car with vehicle-onboard communication unit 35 in a parking area on which ground communication unit 36 is installed, wherein ID card 20 is being attached to card reader 21 of vehicle-onboard communication unit 35. When the car is parked, communication is established between ground communication unit 36 and vehicle-onboard communication unit 35 mounted on the parked car. Then, an individual ID read from ID card 20 and an identification code of device ID unit 25 are transmitted from vehicle-onboard communication unit 35 to ground communication unit 36. Ground communication unit 36 transmits th received individual ID and identification code of device ID unit 25 by network communication unit 28 to center control unit 34 to be used for the monitoring operation.

Next, the user sets theft monitor setting unit 23 to operate the theft monitor function. When the user pulls out ID card 20 from card reader 21, vehicle-onboard communication unit 35 transmits the notice of pulling out ID card 20 to ground communication unit 36. The ground communication unit 36 starts vehicle theft monitoring for the parked car from when ID card 20 is pulled out. This vehicle theft monitoring can be released by turning off theft monitor setting unit 23 after attaching ID card 20 to card reader 21.

On start of vehicle theft monitor, vehicle-onboard communication unit 35 and ground communication unit 36 start periodical communication. After start of communication, if communication between vehicle-onboard communication unit 35 and ground communication unit 36 is stopped due to movement of the car or damage of vehicle-onboard communication unit 35, ground communication unit 36 detects this condition as theft of the car.

Further, if there is trial to continue communication with ground communication unit 36 using another vehicle-onboard communication unit that is different from vehicle-onboard communication unit 35, disagreement occurs in verification of device ID at ID collation unit 29. Ground communication unit 36 detects this condition as theft of the car.

Furthermore, if another ID card, which is different from ID card 20, is used to release the vehicle theft monitoring, disagreement occurs in verification of individual ID at ID collation unit 29. Ground communication unit 36 detects this condition as th ft of the car.

However, the above-described conventional theft protection systems have problems as follows:

In the security system for a parking area disclosed in Japanese Laid-Open patent application publication No.

2002-216256, theft actions involving the car are detected only on the side of the vehicle security system. Thus, if the function of the vehicle security system is stopped, theft of the car cannot be prevented.

Further, the notice of error occurrence by the security system for a parking area cannot be performed unless the error detection signal is received from the vehicle security system through wireless communication. In addition, there is no countermeasure against obstruction to wireless link formed between systems. Thus, interference in transmission of the error detection signal from the vehicle security system disables the vehicle theft protection.

In the parking area managing system disclosed in Japanese Laid-Open patent application publication No. 2002-342897, interruption of communication is detected only by the side of the ground communication unit, and transmission of theft information is performed one-way from vehicle-onboard communication unit to the ground communication unit, so that the vehicle-onboard communication unit cannot detect stopping of the function of the ground communication unit.

In addition, although the ground communication unit side determines whether the vehicle-onboard communication unit is a right one or not, the vehicle-onboard communication side does not determine whether the ground communication vehicle is a right one or not. Accordingly, for example, if the function of the right ground communication unit is stopped to operate a dummy ground communication unit capable of normally responding to the vehicle-onboard communication before the user parks a car in the parking area, the vehicle-onboard communication unit cannot detect that the communication partner is a dummy. In this case, because the dummy ground communication unit is disconnected from the center control unit, the center control unit side cannot interrupt the communication and detect theft by ID collation. Thus, there is a danger of vehicle theft by a pretense to the ground communication unit.

Further, because the communication between the ground communication unit and the vehicle-onboard communication unit is not subjected to encryption, a third party can tap the individual ID or the identification code of the device ID. Thus, for example, if the function of the regular vehicle-onboard communication unit is stopped and as well as a dummy vehicle-onboard communication unit is operated which is capable of transmitting the individual ID and the identification code of the device ID obtained by tapping, the ground communication unit presumes the dummy vehicle-onboard communication unit to be the right one, so that theft of the car cannot be detected. As described above, there is a danger of vehicle theft by pretense to the vehicle-onboard communication unit.

SUMMARY OF THE INVENTION

An object of the present invention is to provide a vehicle theft protection system, a vehicle-onboard device, a management station, a method of preventing vehicles from theft, and a related program capable of resolving the above-described problems and surely preventing actions such as theft or the like.

To achieve the above-described object, the vehicle theft protection system according to the present invention is characterized by a vehicle-onboard device mounted on a vehicle, and a management station installed at a predetermined location, wherein each of the vehicle-onboard device and the management station comprises narrow area wireless communication means capable of communication with encryption in a range of a predetermined distance, and the narrow area wireless communication means of the vehicle-onboard device and the management station effect regular mutual communication to monitor each other's condition.

The method of protecting a vehicle from theft according to the present invention, is characterized by the steps of effecting regular mutual communication between a vehicle-onboard device mounted on a vehicle and a management station installed at a predetermined location through narrow area wireless communication capable of encrypted communication in a range of a predetermined distance, and mutually monitoring conditions of the vehicle-onboard device and the management station through the mutual communication.

The program used in a system comprising a vehicle-onboard device mounted on a vehicle and a management station installed at a predetermined location according to the present invention, is characterized by a process for effecting regular mutual communication between the vehicle-onboard device mounted on the vehicle and the management station at a predetermined location through narrow area wireless communication capable of encrypted communication in a range of a predetermined distance; and a process for mutually monitoring conditions of the vehicle-onboard device and the management station through mutual communication, the processes being executed by computers of the vehicle-onboard device and the management station, respectively.

As described above, in the vehicle theft protection system, the method of protecting a vehicle from theft, the vehicle-onboard device, the management station, and the program for protecting a vehicle from theft according to the present invention, if there is communication interference, or movement of the vehicle, the regular mutual communication is necessarily interrupted. This provides detection of vehicle theft action. Further, because the vehicle-onboard device and the management station always mutually confirm the conditions through mutual communication, if either of functions of the vehicle-onboard device or the management station is stopped, the other instantaneously detects this condition.

Furthermore, the mutual communication is provided between the vehicle-onboard device and the management station with security, so that there is no conventional problem of tapping by a third party.

In the above-described vehicle theft protection system, method of protecting a vehicle from theft, and program for protecting a vehicle from theft according to the present invention, the vehicle-onboard device and the management station may effect mutual verification through the narrow area wireless communication means at start of the mutual communication. According to this structure, if the management station is deceived, disagreement in mutual verification occurs on the vehicle-onboard device side, and the user is informed of the notice. If the vehicle-onboard device is deceived, disagreement in mutual verification occurs on the management station side, and thus the user is informed of the notice.

Further, the mutual verification may be provided as follows:

The management station reads out first mutual verification information necessary for the mutual verification from an IC card shown by a user possessing the vehicle-onboard device and transmits the read first mutual verification information to the vehicle-onboard device through the narrow area wireless communication. The vehicle-onboard device transmits, to the management station through the narrow area wireless communication, previously registered second mutual verification information corresponding to the first mutual verification information. The management station collates the second mutual verification information received from the vehicle-onboard device with the first mutual verification information read out from the IC card. The vehicle-onboard device collates the first mutual verification information received from the management station with the registered second mutual verification information.

According to this structure, a third party cannot obtain the mutual verification information necessary for the mutual verification unless the third party obtains the IC card. Thus, protection is more intensified against pretending to be the vehicle-onboard device or management station.

Further, the mutual verification may be provided as follows:

On start of mutual communication, the management station reads out, from the IC card, first user verification information necessary for verification of the user possessing the vehicle-onboard device and collates the read first user verification information with previously registered second user verification information corresponding to the first user verification information. According to this structure, a third party without the right IC card cannot use the system, so that protection is more intensified against pretending to be the vehicle-onboard device or management station.

Further, when an error is detected by either or both the vehicle onboard device and management station during monitoring the mutual condition through mutual communication, a notice of detecting the error can be relayed by wide area wireless communication means of which communicable distance is larger than that of the narrow area wireless communication. In this case, a cable communication may be used for relaying the error by the management station instead of the wide area wireless communication. According to this structure, the user can be informed of the error in the vehicle at a location remote from the parking area.

Furthermore, when the user transmits a request for confirming the condition of the vehicle through the wide area communication or cable communication to the management station, the user can be informed about the condition of the vehicle with the wide area communication or the cable communication in response to the request. In addition, when the user transmits a request for controlling the vehicle through the wide area communication or the cable communication to the management station, the management station can request the vehicle-onboard device to control the vehicle through the narrow area wireless communication in response to the request by the management station, and to control a predetermined operation of the vehicle by the vehicle-onboard device in response to the request from the management station. According to this structure, the user can monitor the condition of the vehicle while parked and control the vehicle at a remote location, so that the usefulness of the system can be improved.

An aspect of the present invention provides a management station comprising: narrow area wireless communication means for communicating with a vehicle-onboard device on a vehicle in a range of a predetermined distance; and control means for effecting regular mutual communication with the vehicle-onboard device with the narrow area wireless communication means to monitor each other's condition. The control means may effect mutual verification through the narrow area wireless communication means of the vehicle-onboard device and the management station at start of the mutual communication. Further, the management station may further comprise information reading means for reading out information from an IC card storing at least first mutual verification information necessary for the mutual verification, wherein during the mutual verification, the management station may transmit the first mutual verification information read out with the information reading means from the IC card to the vehicle-onboard device with the narrow area wireless communication means and as well as may collate with the read first mutual verification information, second mutual verification information, corresponding to the first mutual verification information, received from the vehicle-onboard device through the narrow area wireless communication means.

Another aspect of the present invention provides a vehicle-onboard device mounted on a vehicle, comprising: narrow area wireless communication means capable of encrypted communication with a management station in a range of a predetermined distance; and control means for effecting regular mutual communication with the management station to monitor each other's condition. The control means may effect mutual verification through the narrow area wireless communication means at start of the mutual communication. In addition, during the mutual verification, the control means may transmit previously registered first mutual verification information to the management station with the narrow area wireless communication means and as well as may collate, with the registered first mutual verification information, second mutual verification information, corresponding to the first mutual verification information, received from the management station through the narrow area wireless communication means.

As described above, according to the present invention, interference, deception, tapping by a third party of the vehicle-onboard device and the management station can be surely protected. Thus, a reliable vehicle theft protection system is provided.

In addition, according to the present invention, because it is possible to transmit a notice to the user and to inform the user of the vehicle condition or control the vehicle in response to the user through the wide area wireless communication, a vehicle theft protection system can be provided with a high convenience.

The above and other objects, features, and advantages of the present invention will become apparent from the following description with reference to the accompanying drawings which illustrate examples of the present invention.

DESCRIPTION OF THE PREFERRED EMBODIMENTS

Preferred embodiments of the present invention will be described with reference to the drawings.

First Embodiment

Figure 2:
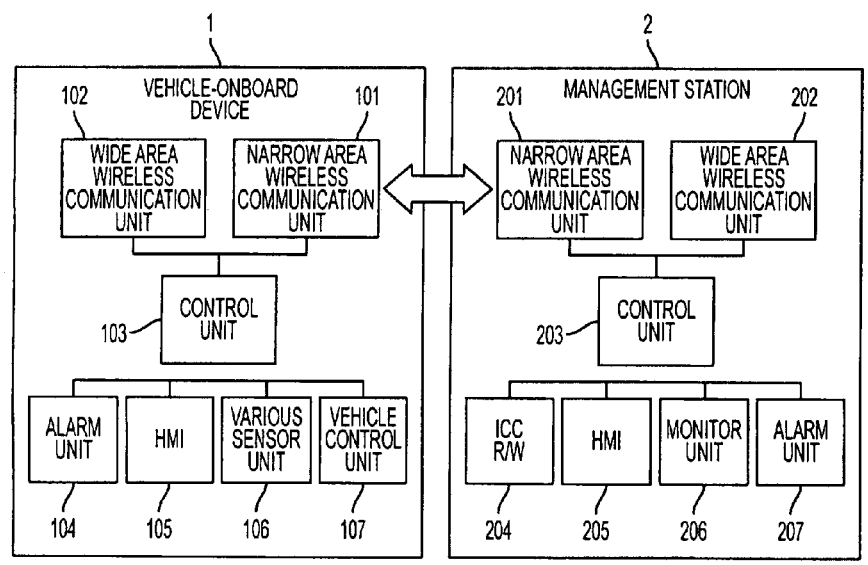
FIG. 2 is a block diagram illustrating a general structure of a vehicle theft protection system according to a first embodiment of the present invention.

FIG. 2 is a block diagram illustrating a general structure of a vehicle theft protection system according to a first embodiment of the present invention. This vehicle theft protection system comprises vehicle-onboard device 1 mounted on a vehicle and management station 2 equipped at a predetermined location. This system detects an action such as stealing a vehicle, thieving goods in a vehicle, protects such an action, and effects countermeasure from such an action with cooperation between these vehicle-onboard device 1 and management station 2 while the vehicle is parked. Management station 2 can be installed at any place capable of cooperative operation with vehicle-onboard device 1 such as a parking area and an individual yard.

Vehicle-onboard device 1 comprises narrow area wireless communication unit 101, wide area wireless communication unit 102, control unit 103, alarm unit 104, HMI (Human machine interface) 105, various sensor unit 106, and vehicle control unit 107.

Narrow area wireless communication unit 101 is a wireless communication unit of which communicable area is limited to a small area. For example, wireless LAN communication units, a Bluetooth (a trademark of Bluetooth SIG, Inc.) unit, limited small power transceivers defined by Japanese radio law, infrared communication units, RF-IF (Radio Frequency Identification) tags, and the like are utilizable as n arrow area wireless communication unit 101.

Wide area wireless communication unit 102 is a wireless communication unit of which communicable area is very wide. For example, cellular phones, PHSs (Personal Handyphone System), MCA (Multi channel Access system) radio wave units, amateur radio wave units, and the like are utilizable as wide area wireless communication unit 102.

Control unit 103 controls operation of various functions of the vehicle-onboard device 1. Alarm unit 104 raises alarm therearound on occurrence of vehicle theft or its anticipated condition. For example, buzzers, sirens, rotary lights, flashlights, and the like are utilizable as control unit 103. HMI 105 allows input of information by the user, providing information to the user, and providing an instruction to the user. For example, keyboards, ten-key pads, touch panels, speech recognition units, displays, LED lamps, speech synthesis units, and the like are utilizable as HMI 105.

Various sensor unit 106 is a sensor unit detecting various conditions of the vehicle. For example, door open/close sensors, door lock sensors, bonnet open/close sensors, trunk open/close sensors, ignition-key-condition sensors, gear shift position sensors, parking brake condition sensors, headlamp-turned-on sensors, speed sensors, vibration sensors, inclination sensors, inside-vehicle-human-being sensors and outside-vehicle-human-being sensors (visible video cameras, infrared video cameras, infrared sensors, ultrasonic sensors), GPS units, and the like are utilizable as various sensor unit 106.

Vehicle control unit 107 controls the unmanned vehicle. For example, a door lock control unit, a trunk lock control unit, a window/roof control unit, an ignition control unit, an engine control unit, an electronic control unit (ECU), a room lamp control unit, a light on/off control unit, and the like are utilizable as vehicle control unit 107.

Management station 2 comprises narrow area wireless communication unit 201, wide area communication unit 202, control unit 203, ICC R/W 204, HMI 205, monitor unit 206, and alarm unit 207.

Narrow area wireless communication unit 201 is a wireless communication unit of which communicable area is limited to a small area. For example, wireless LAN communication units, a Bluetooth (a trademark of Bluetooth SIG, Inc.) units, limited small power transceivers defined by Japanese radio law, infrared communication units, RF-IF (Radio Frequency Identification) tags, and the like are utilizable as narrow area wireless communication unit 201.

Wide area communication unit 202 is a wireless communication unit with a very wide communicable. For example, analog fixed telephones, ISDN units, ADSL units, the Internet, cellular phones, PHSs (Peasonal Hndyphone System), MCA (Multi channel Access system) radio wave units, amateur radio wave units, and the like are utilizable as wide area communication unit 202.

Control unit 203 controls operation of various functions of the management station. ICC R/W 204 is a reader/writer for reading information from an IC card and writing information on the IC card. HMI 205 allows input of information by the user and provides information and an instruction to the user. For example, keyboards, ten-key pads, touch panels, speech recognition units, displays, LED lamps, speech synthesis units, and the like are utilizable as HMI 205.

Monitor unit 206 monitors vehicles and the parking area. For example, visible video cameras, infrared video cameras, and the like are utilizable as monitor unit 206. Alarm unit 207 raises alarm thereabout on occurrence of vehicle theft or its anticipation. For example, buzzers, sirens, rotary lights, flashlights, and the like are utilizable as alarm unit 207.

As above-described vehicle theft protection system according to the embodiment has three features characterized as protection from theft as follows:

(a) Transition to and releasing from a Verification Mode and a Theft Protection Mode using an IC Card.

(b) Mutual verification and mutual condition confirmation through communication with security between narrow area wireless communication units 101 and 201.

(c) Condition Confirmation and Controlling of the Vehicle and Releasing the theft protection mode using Wide Area Wireless Communication Unit 102 and Wide Area Communication Unit 202.

Thus, these functions surely and instantaneously protect the vehicle from theft. The communication with security between narrow area wireless communication units 101 and 201 is, for example, communication using IP sec (IP Security Architecture) which is a standard defined by IAB (Internet Architectural Board). IP sec is capable of encrypting and verifying data in packet level, so that tapping or forging of IP packets can be prevented.

Upon using the vehicle theft protection system according to this embodiment, the user previously purchases the vehicle-onboard device 1 and obtains IC card from a contractor managing this system. Then, mounting vehicle-onboard device 1 on its own vehicle enables the use of this vehicle theft protection system.

Figure 3A:
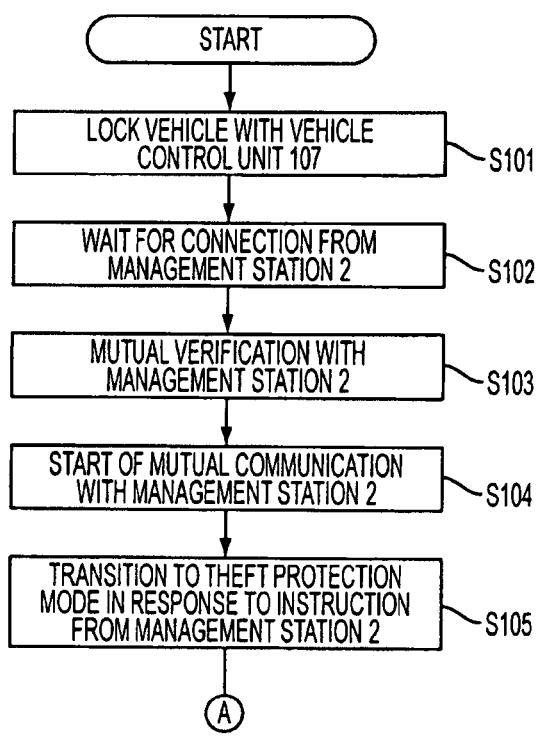
FIGS. 3A–3C depict flow charts illustrating operation of the vehicle-onboard device shown in FIG. 2.
Figure 3B:
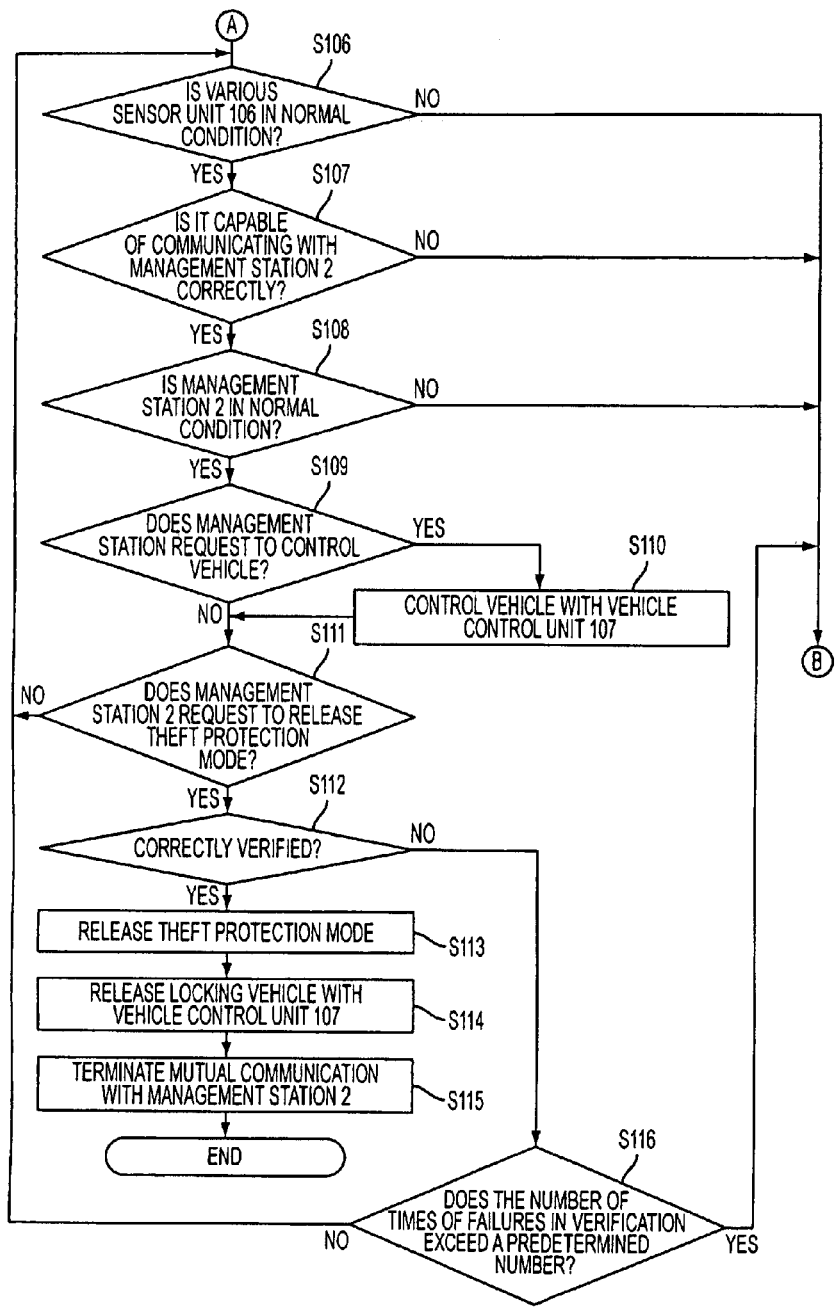
Figure 3C:
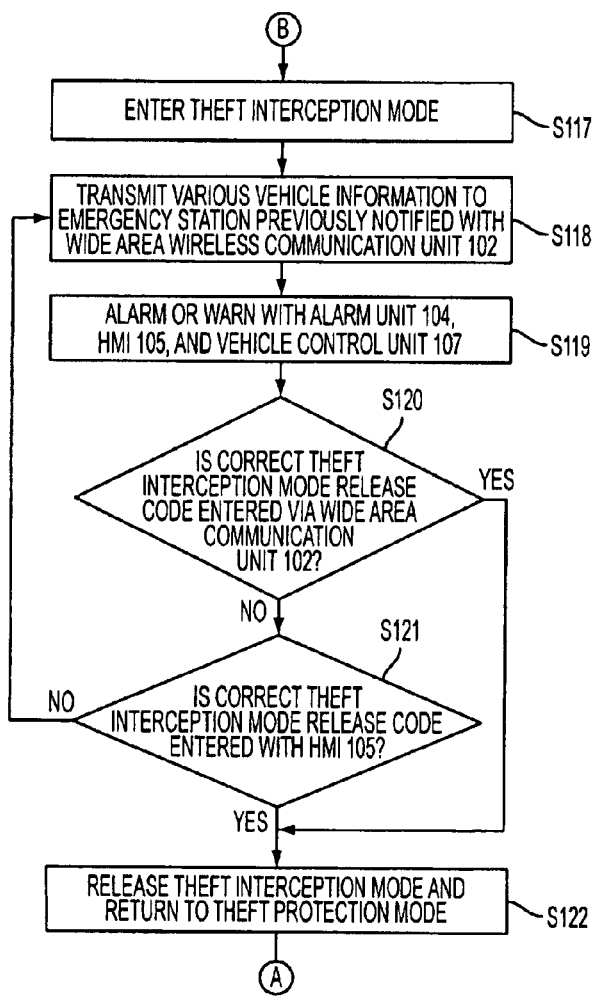

FIGS. 3A–3C depict flow charts illustrating operation of vehicle-onboard device 1. FIGS. 4A–4C and 5 depict flow charts illustrating operation of the management station 2. More specific operation of the vehicle theft protection system according to the embodiment will be described in detail with reference to FIGS. 3A–3C, 4A–4C and 5.

(1) Operation in Transition to Theft Protection Mode Via the Mutual Verification When the user parks the vehicle in the parking area, vehicle-onboard device 1 is activated in response to an instruction by the user or activated in accordance with its own judgment in response to variation of a vehicle condition and locks the vehicle (step S101). The instruction by the user or variation of a vehicle condition corresponds, for example, to the case where the user depresses a security button of the vehicle-onboard device, the case that the user shifts the shift lever to parking and stops the engine and manually locks the doors, or the case that the user locks the doors with a remote control function outside the vehicle. Further, locking the vehicle means, for example, that a window/roof is closed and doors are locked, and ignition and injection of fuel in the engine is inhibited. After locking, the vehicle-onboard device 1 enters a connection standby condition waiting for a connection from management station 2 (step S102).

Next, the user effects verification with the IC card at the management station. During the verification, management station 2 instructs the user to insert the IC card into ICC R/W 204 (step S201). In response to this instruction, when the user inserts the IC card into ICC R/W 204, management station 2 instructs the user to enter a personal identification code with HMI 205 (step S202). In response to this Instruction, when the user enters the personal identification code with HMI 205, management station 2 compares the personal Identification code stored in the inserted IC card with the entered personal code (step S203). If the verification has been done correctly through this collation, processing proceeds to step S204, and if the verification has not been done correctly, processing returns to the above-described step S201.

In step S204, management station 2 reads out from the IC card the vehicle information and a station for emergency notification. The vehicle information is, for example, a car number, a model number, a color, a possessor, information necessary for communicating with vehicle-onboard device 1, verification information (for example, electronic certification) necessary for the mutual verification with the vehicle-onboard device 1. The information of the station for emergency notification is, for example, a telephone number, a mail address, of the user and a telephone number and a mall address of a security firm.

Next, management station 2 starts communication using the narrow area wireless communication through narrow area wireless communication unit 201 with vehicle-onboard device I in standby condition caused by step S102. On start of this communication, management station 2 transmits to vehicle-onboard device 1 the verification information read from the IC card. On the other hand, vehicle-onboard device 1, in which is previously stored verification information corresponding to the verification information stored in the IC card, transmits the corresponding verification information to management station 2. Thus, transmission of verification information is mutually conducted between vehicle-onboard device 1 and management station 2 and on the basis of the exchanged verification information, mutual verification is effected (step S103, S205). After verification, both management station 2 and vehicle-onboard device 1 enter a regular mutual communication condition with security (step S104, S206). For narrow area wireless communication, for example, IP sec is adopted, so that tapping or manipulation by a third party is impossible. In this mutual verification between vehicle-onboard device 1 and management station 2 (steps S103, S205) and transition to the mutual communication condition (steps S104, S 206) is accompanied with the following process of phase 0 to 3.

Phase 0: an encryption/decryption key is generated for phases 1 and 2. More specifically, a key is generated with a "Diffie-Hellman" algorithm.

Phase 1: Mutual verification is conducted with electronic certification. More specifically, management station 2 transmits the electronic certification read out from the IC card to vehicle-onboard device 1. On the other hand, vehicle-onboard device 1 transmits the previously stored electronic certification to management station 2. In this transmission and reception of the electronic certifications between the vehicle-onboard device 1 and the management station 2, the encryption/decryption process is performed with the encryption/decryption key generated in phase 1. Management station 2 compares the electronic certification read out from the IC card with the electronic certification received from vehicle-onboard device 1. The vehicle-onboard device 1 compares the previously stored electronic certification with the electronic certification received for management station 2.

Phase 2: A method of encryption used in phase 3 is determined and as well as its encryption/decryption key is generated. An optimum method of encryption is selected through negotiation between vehicle-onboard device 1 and management station 2.

Phase 3: Communication with security is started with the encryption/decryption key generated in phase 2.

When the mutual communication begins between vehicle-onboard device 1 and management station 2 as described above, management station 2 tries to detect the position of the vehicle from sensors mounted on the vehicle during the mutual communication. If the position of the vehicle cannot be obtained, the user is requested to enter the position of the vehicle (step S207). After this, management station 2 instructs vehicle-onboard device 1 to enter the theft protection mode and shifts itself into the theft protection mode (step S208). Upon receiving the instruction to enter the theft protection mode, vehicle-onboard device 1 shifts itself into the theft protection mode (step S105).

(2) Operation After Transit to Theft Protection Modes:

After transit to theft protection modes, vehicle-onboard device 1 and management station 2 confirm the mutual conditions and shift their own operation stats to the theft protection modes when any error is detected. Next, operation will be separately described on sides of vehicle-onboard device 1 and management station 2.

(2-a) Operation of Vehicle-onboard Device 1 (Refer to FIGS. 3A–3C):

During execution of the theft protection mode, vehicle-onboard device 1 always confirms whether various sensor unit 106 normally operates (step S106), whether a normal communication with management station 2 is practicable (step S107), and whether the condition of management station 2 is normal (step S108). If "No" is provided in any step from S106 to S108, vehicle-onboard device 1 enters the theft interception mode at step S117, and if "Yes" are provided in all steps, processing proceeds to step S109.

In step S109, vehicle-onboard device 1 determines whether management station 2 requests to control the vehicle. If the result of this confirmation is "Yes", at step S110, vehicle control unit 107 controls the vehicle in response to the control request of the vehicle from management station 2, and then processing proceeds to step S111. If the result of confirmation in step S109 is "No", processing directly proceeds to step S11.

In step S111, vehicle-onboard device 1 determines whether management station 2 requires releasing the theft protection mode. If the result of confirmation in step S111 is "No", processing returns to step S106. If the result of confirmation in step S111 is "Yes", at step S112, mutual verification which is similar to that in step S103 is performed again. If the verification is performed normally, at step S113, vehicle-onboard device 1 releases the theft protection mode in step S113, at step S114, the lock of the vehicle is released by vehicle control unit 107, and at step S115, vehicle-onboard device 1 terminates the mutual communication with management station. The termination of the mutual communication stops the whole operation of the theft protection system. Thus, the user can move the vehicle.

If the verification in step S112 is not correctly executed, at step S116, vehicle-onboard device 1 determines whether the number of times of failures in verification exceeds a predetermined value. If the determination in step S116 is "No", processing returns to step S106. If the determination in step S116 is "Yes", at step S117, vehicle-onboard device 1 shifts to the theft interception mode.

If "No" is provided in any one of steps S106 to S108, or if the determination in step S116 is "Yes", so that processing enters the theft protecting mode in step S117, vehicle-onboard device 1 transmits a notification to the station for emergency notification with wide area wireless communication unit 102 in at step S18 and raises alarm and/or warning with alarm unit 104, HMI 105, and vehicle control unit 107 at step S119. After this, at step S120, vehicle-onboard device 1 determines whether the correct release code for the theft interception mode is applied thereto via the wide area wireless communication unit 102. If the result of this confirmation in step S120 is "No", at step S121, vehicle-onboard device 1 determines whether a correct release code for the theft interception mode is applied with HMI 105. If the result of this confirmation in step S121 is "No", processing returns to step S118.

If the confirmation in steps S120 or S121 are "Yes", at step S122, vehicle-onboard device 1 releases the theft interception mode and as well returns to the theft protection mode. After this, processing returns to the above-described step S106.

(2-b) Operation of Management Station 2 (Refer to FIGS. 4A–4C):

During execution of the theft protection mode, management station 2 always determines whether monitor unit 206 normally operates (step S209), whether a normal communication with vehicle-onboard device 1 is practicable (step S210), and whether the condition of the vehicle-onboard device 1 is normal (step S211). If any one of steps S209 to S211 provides "No", management station 2 enters the theft interception mode at stop S221, and if all steps provide "Yes", processing proceeds to step 8212.

In step S212, management station 2 determines whether a request for controlling the vehicle or confirming the vehicle condition is entered through wide area communication unit 202 or HMI 205. If the result of this confirmation in step S212 is "Yes", at step S213, the control unit 203 according to previously set vehicle condition confirmation and control routine, instructs vehicle-onboard device 1 to control the vehicle and transmits the notice of the vehicle condition to the user. After this, processing proceeds to step S214. If the result of confirmation in step S212 is "No", processing directly proceeds to step S214.

In step S214, management station 2 determines whether a request for releasing the theft protection mode is entered through HMI 205. If the result of this confirmation in step S214 is "No", processing returns to step S209. If the result of this confirmation in step S214 is "Yes", at step 8215, management station 2 instructs the user to insert the IC card into ICC R/W 204. In response to this instruction, when the user inserts the IC card in ICCR/W 204, at step S216, management station 2 instructs the user to enter his personal identification code with HMI 205. In response to this instruction, when the user enters the personal identification code with HMI 205, management station 2 compares the personal identification code stored In the inserted IC card with the personal identification code entered by the user in step S217. If the verification is correctly executed by this collation, management station 2 instructs to release the theft protection mode at step S218 and terminates the mutual communication with vehicle-onboard device 1 at step S219. The termination of the mutual communication stops the whole operation of the theft protection system, so that the user can move the vehicle.

In step S217, if the verification is not correctly executed, management station 2 determines whether the number of times of failures in verification exceeds a predetermined value at step S220. If the determination is "No", processing returns to step S209, and if the determination is "Yes", management station 2 shifts to the theft interception mode at step 3221.

If "No" is provided in any one of steps SS209 to S211, or if the determination in step S220 is "Yes", so that processing enters the theft interception mode in step S221, management station 2 transmits a notification to the station for emergency notification with wide area wireless communication unit 202 at step S222. Then, management station 2 intensifies monitoring the vehicle with monitor unit 206 at step S223 and raises alarm and/or warning with alarm unit 207 and HMI 205 at step S224. After this, at step S225, management station 2 determines whether the correct release code for the theft interception mode is applied via the wide area communication unit 202. If the confirmation in step S225 is "No", at step S226, management station 2 determines whether a correct release code for the theft interception mode is applied with HMI 205. If the confirmation in step S226 is "No", processing returns to step S222.

If the confirmation in steps S225 or S226 is "Yes", at step S227, management station 2 releases the theft interception mode and as well processing returns to the theft protection mode. After this, processing returns to step S209.

Figure 5:
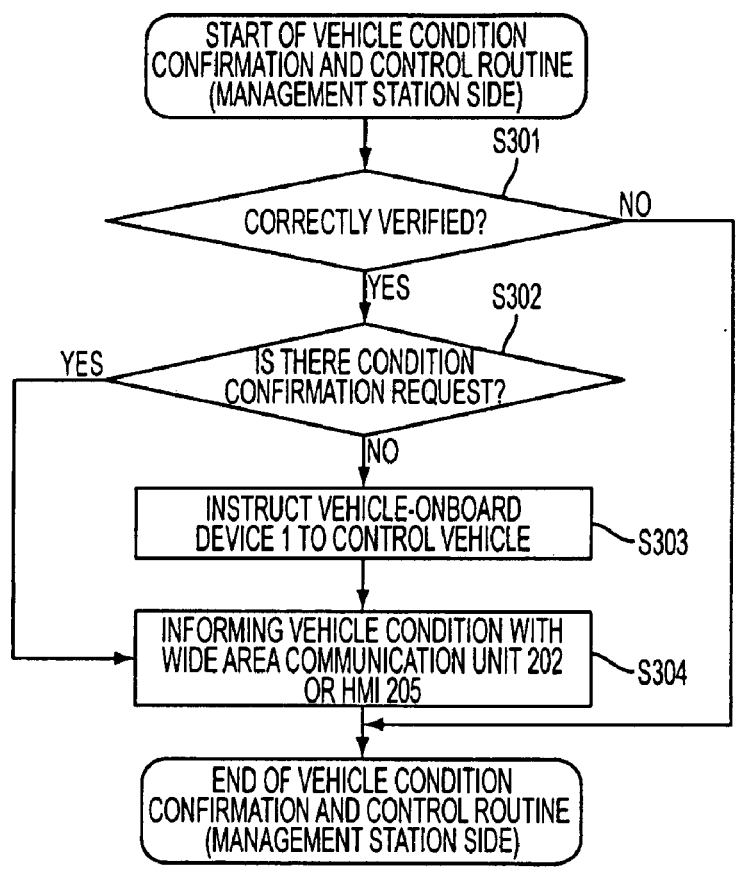
FIG. 5 depicts a flow chart illustrating operation of a vehicle condition confirmation and control routine executed by the management station shown in FIG. 2.

Next, the vehicle condition confirmation and control routine in step S213 will be described in detail with reference to FIG. 5.

In this control, first, verification of the user is performed at step S301. In this user verification, basically the same process as that for verification in the above-described steps S215 to S217 is executed.

If the confirmation in step S301 is "Yes", at step S302, management station 2 determines whether the request is for confirmation of the vehicle condition. If "No", management station 2 terminates the vehicle condition confirmation and control routine. In the determination in step S302 is "No", at step S303, management station 2 transmits an instruction to control the vehicle to vehicle-onboard device 1. If "Yes", at step S304, management station 2 informs the user about the vehicle condition with wide area communication unit 202 or HMI 205. After informing the user of the vehicle condition, management station 2 terminates the vehicle condition confirmation and control routine.

According to the vehicle theft protection system of the embodiment, a user is subjected to verification as to whether the user is the right user through inserting an IC card and entering his own personal identification code at management station 2. Thus, a third party without a right IC card cannot perform a false input operation at management station 2. Further, though a third party illegally obtains an IC card, the third party cannot perform a false input operation at management station 2 unless the third party obtains the personal identification code.

In addition, on start of the mutual communication, vehicle-onboard device 1 and management station 2 effect mutual verification. Thus, if there is a pretense of being management station 2 (corresponding to pretending to be the ground communication unit in Japanese Laid-Open patent application publication No. 2002-342897), on the side of vehicle-onboard device 1 the mutual verification will result in disagreement and the user is informed of the result. If pretense of being vehicle-onboard device 1 is carried out (corresponding to pretending to be the vehicle-onboard communication unit in Japanese Laid-Open patent application publication No. 2002-342897), on the side of management station 2, the mutual verification results in disagreement and the user is informed of the result. Notification of failure in the mutual verification to the user is carried out, for example, by alarm units 104 and 207.

Furthermore, because the mutual communication between vehicle-onboard device 1 and management station 2 is effected by communication with security (e.g., IPsec communication method), tapping by a third party, which is inherent in conventional system, can be prevented.

In addition, because during execution of the theft protection mode, vehicle-onboard device 1 and management station 2 always confirm each other's condition, when any of functions of vehicle-onboard device 1 and management station 2 is stopped, such a condition is instantaneously detected. For example, if the function of vehicle-onboard device 1 is stopped, management station 2 detects it as an abnormal condition, and if the function of management station is stopped, vehicle-onboard device 1 detects it as an abnormal condition. This provides detecting theft of the vehicle, though the function of vehicle-onboard device 1 or management station 2 is falsely stopped.

Further, because the communication between the vehicle-onboard device 1 and management station 2 is carried out by a narrow area wireless communication of which the communicable area is limited, movement of the vehicle necessarily interrupts the communication. Thus, if the vehicle is stolen by moving with a wrecker or by lifting it up, the communication interruption provides detection of thievery. This theft protection with such a narrow area wireless communication is advantageous in cost because there is no need of mounting a special sensor on the vehicle.

In addition, because vehicle-onboard device 1 and management station 2 always (periodically) communicate with each other, interference in communication can be detected as an abnormal condition. Thus, interference of communication between vehicle-onboard device 1 and management station 2 also provide detection of stealing/theft of the vehicle.

Furthermore, according to the embodiment because management station 2 can respond to inquiry of the vehicle condition from the wide area communication unit 202, the user can remotely monitor the condition of the parked vehicle. In addition, because management station 2 can receive a request for controlling the vehicle from the user through wide area communication unit 202 and can transmit instruction corresponding to the received control request to vehicle-onboard device 1 with the narrow area wireless unit 202, the user can remotely control the parked vehicle. This operation enables remote maintenance of the parked vehicle.

Second Embodiment

Figure 6:
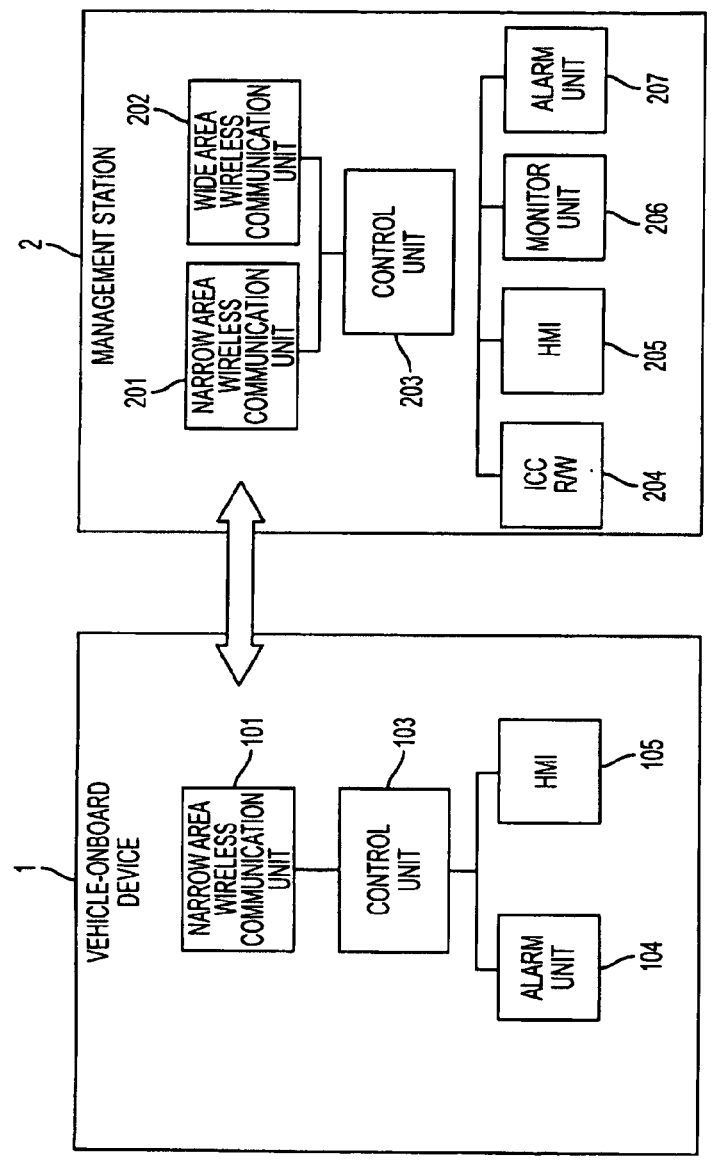
FIG. 6 is a block diagram illustrating a general structure of a vehicle theft protection system according to a second embodiment of the present invention.

FIG. 6 is a block diagram illustrating a general structure of a vehicle theft protection system according to a second embodiment of the present invention. This vehicle theft protection system is obtained by removing wide area wireless communication unit 102, various sensor unit 106, and vehicle control unit 107 from the structure of vehicle-onboard device 1 shown in FIG. 2. The same or corresponding elements or parts are designated with like references between FIGS. 2 and 6.

Upon using the vehicle theft protection system according to this embodiment, the user also previously purchases the vehicle-onboard device 1 and obtains an IC card from a contractor managing this system. Then, mounting vehicle-onboard device 1 on his own vehicle enables him to use this vehicle theft protection system.

Figure 7A:
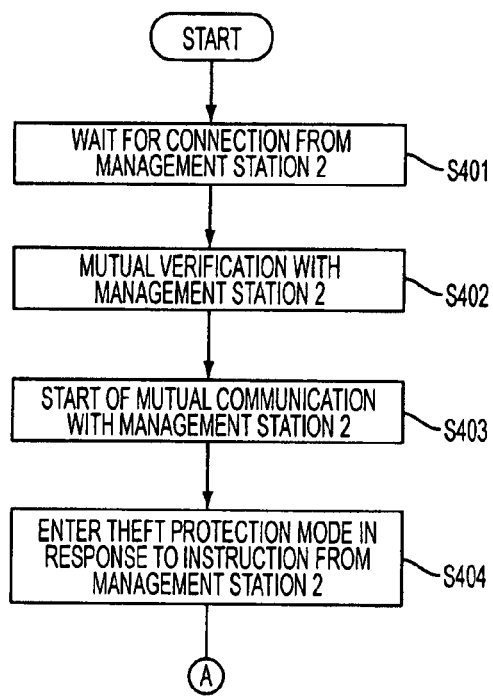
FIGS. 7A–7C depict flow charts illustrating operation of the vehicle-onboard device shown in FIG. 6.
Figure 7B:
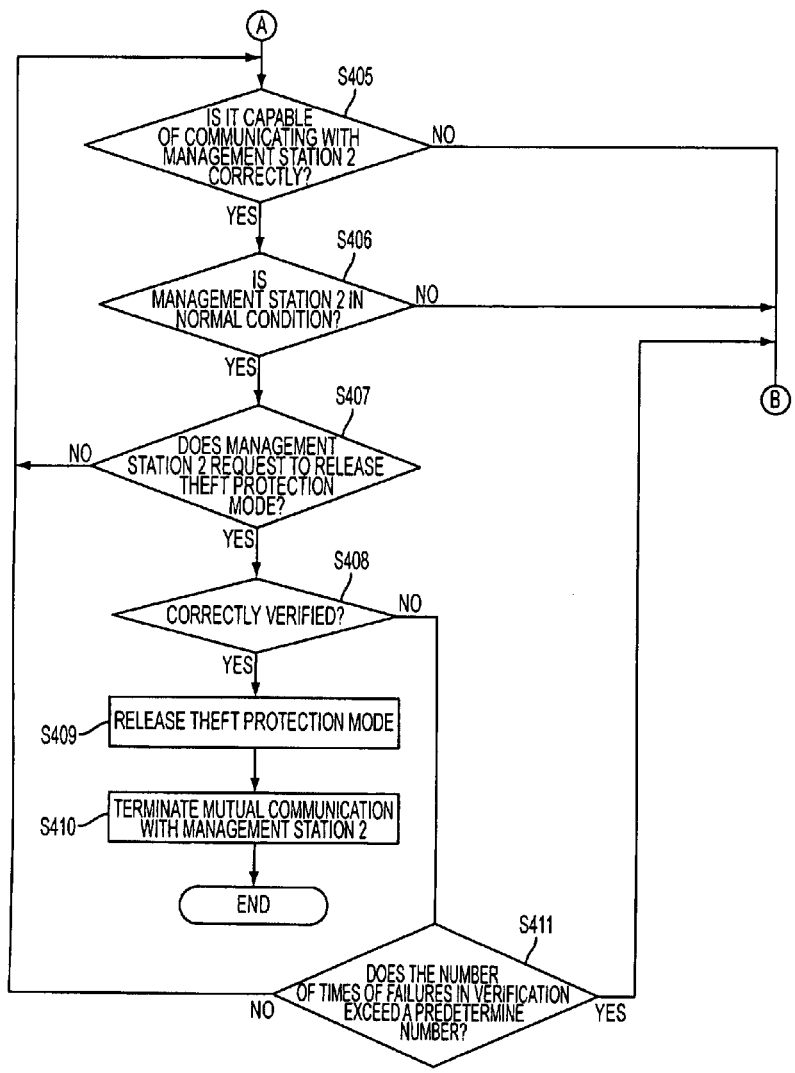
Figure 7C:
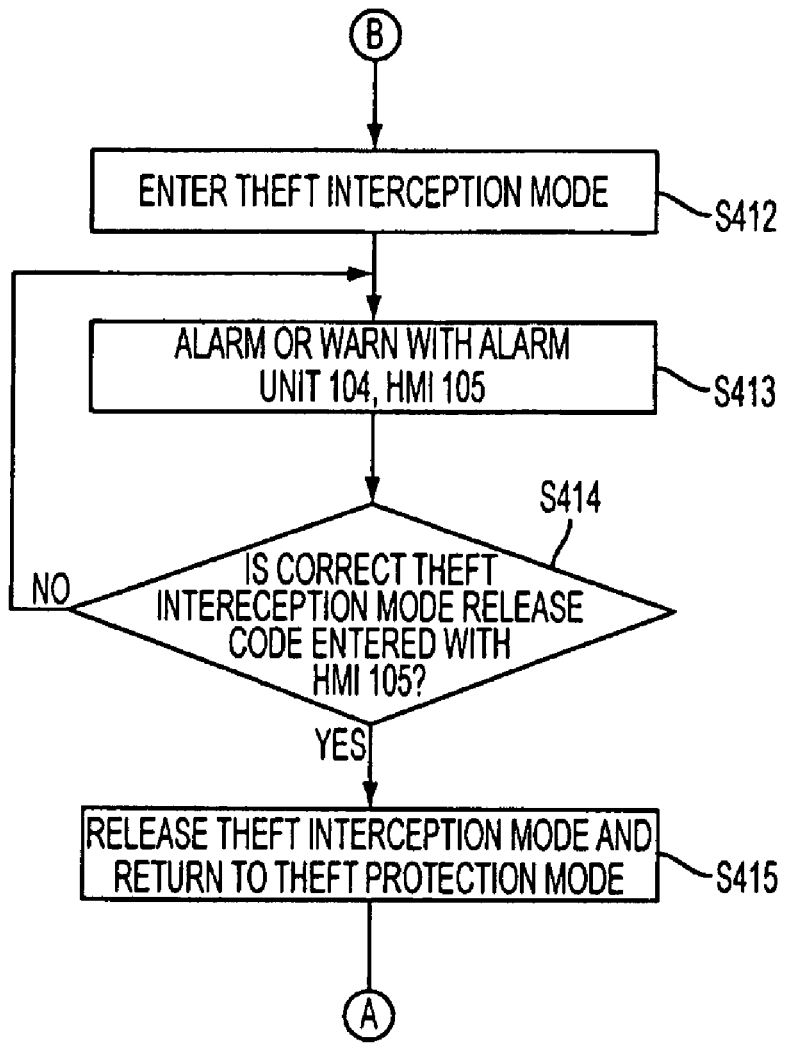
Figure 8A:
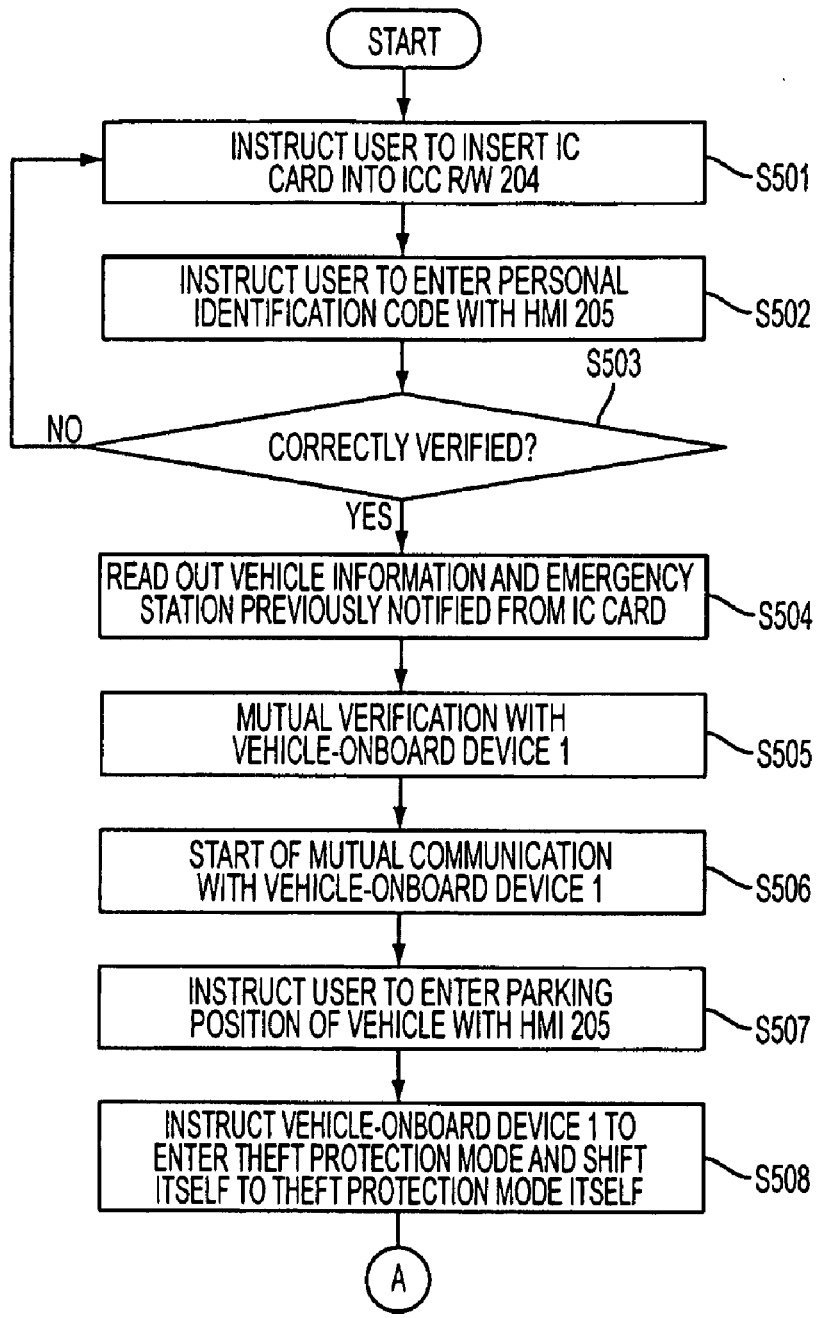
FIGS. 8A–8C depict flow charts illustrating operation of the management station shown in FIG. 6.
Figure 8B:
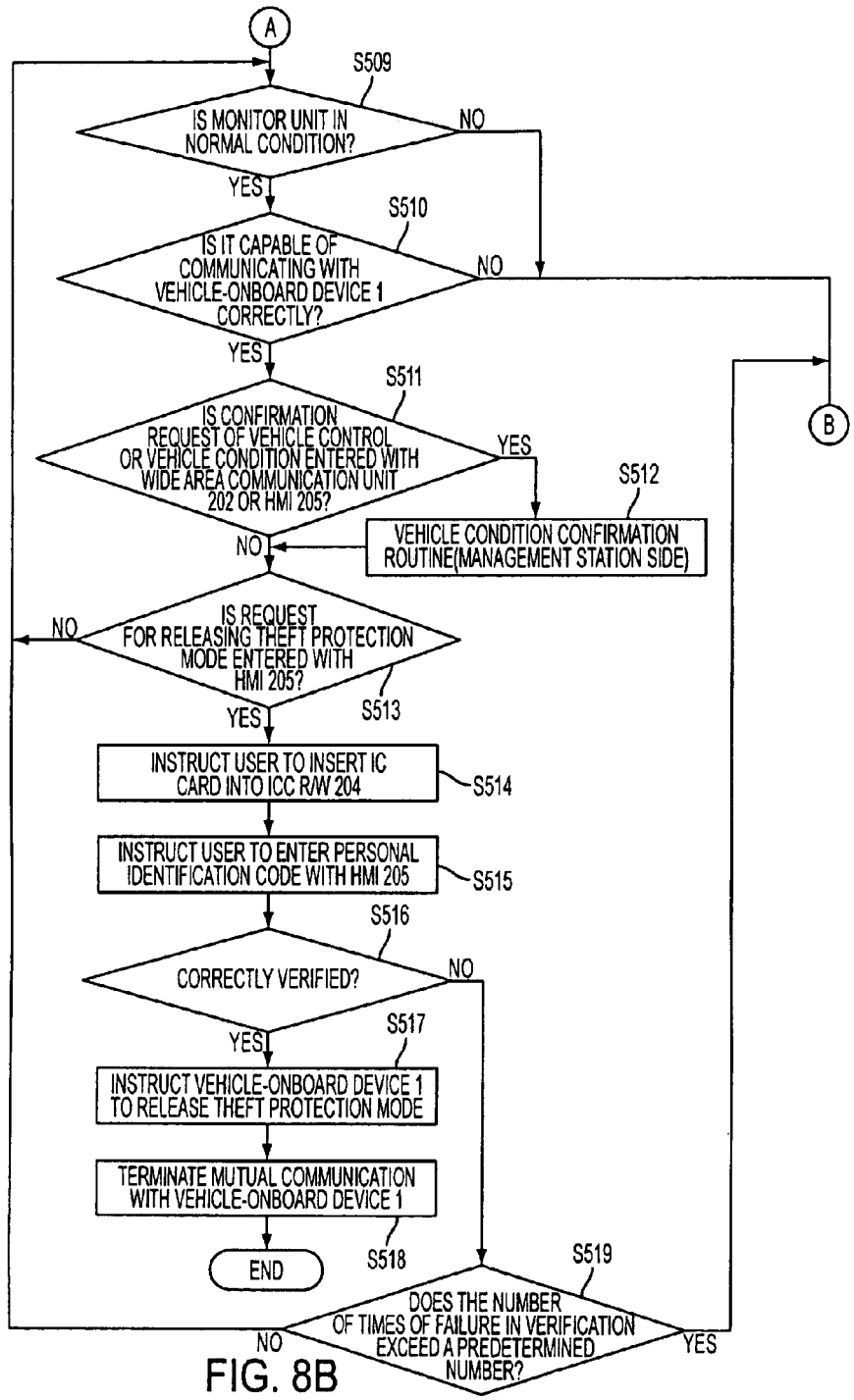
Figure 8C:
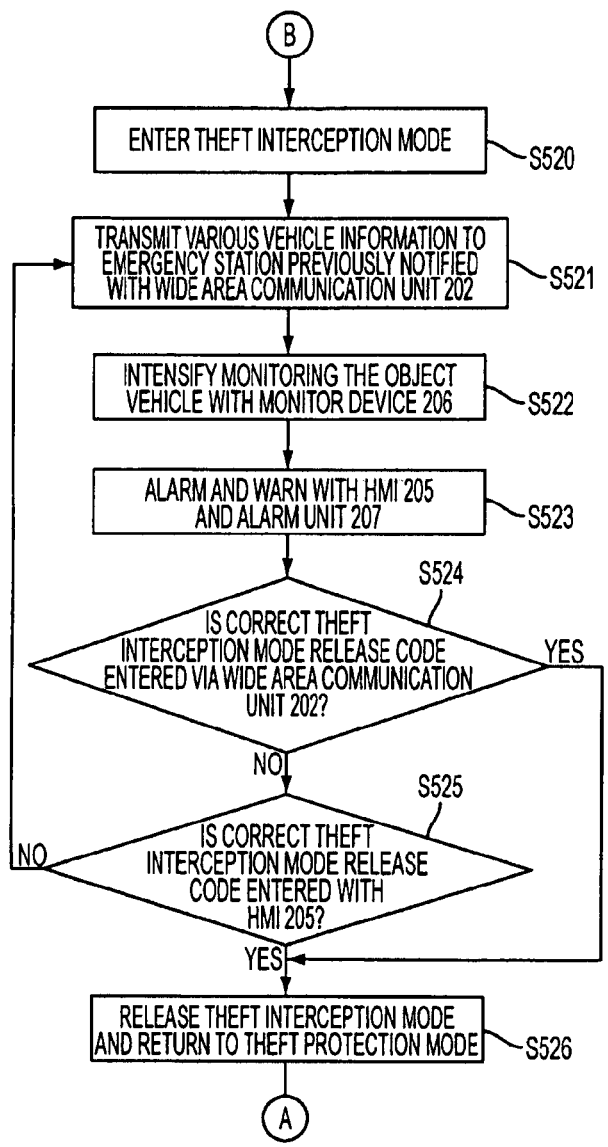

FIGS. 7A–7C depict flow charts illustrating operation of vehicle-onboard device 1, FIGS. 8A–8C and 9 depict flow charts illustrating operation of management station 2. Operation of the vehicle theft protection system according to the embodiment will be described in detail with reference to FIGS. 7A–7C and 8A–8C.

(1) Operation in Transition to Theft Protection Mode Via the Mutual Verification:

When the user parks the vehicle in the parking area, vehicle-onboard device 1 is activated in response to an instruction by the user and enters a standby condition waiting for connection from management station 2 (step S401). The instruction by the user corresponds to a predetermined input operation on vehicle-onboard device 1, namely, for example, depressing a security button.

Next, management station 2 effects verification with the IC card (steps S501 to S503) and reads out information from the IC card (step S504). Following this, mutual verification is carried out between vehicle-onboard device 1 and management station 2 using the narrow area wireless communication (e.g., IP sec) with security to protect the mutual communication from tapping or manipulation by a third party (steps S402, S505). After verification between vehicle-onboard device 1 and management station 2, mutual communication is started using the narrow area wireless communication (steps S403, S506).

When the mutual communication between vehicle-onboard device 1 and management station 2 starts, management station 2 requests the user to enter a location of the vehicle during the mutual communication (step S507). After this, management station 2 instructs vehicle-onboard device 1 to enter the theft protection mode and shifts itself to the theft protection mode (step S508). In response to the instruction, vehicle-onboard device 1 enters the theft protection mode (step S404).

Figure 4A:
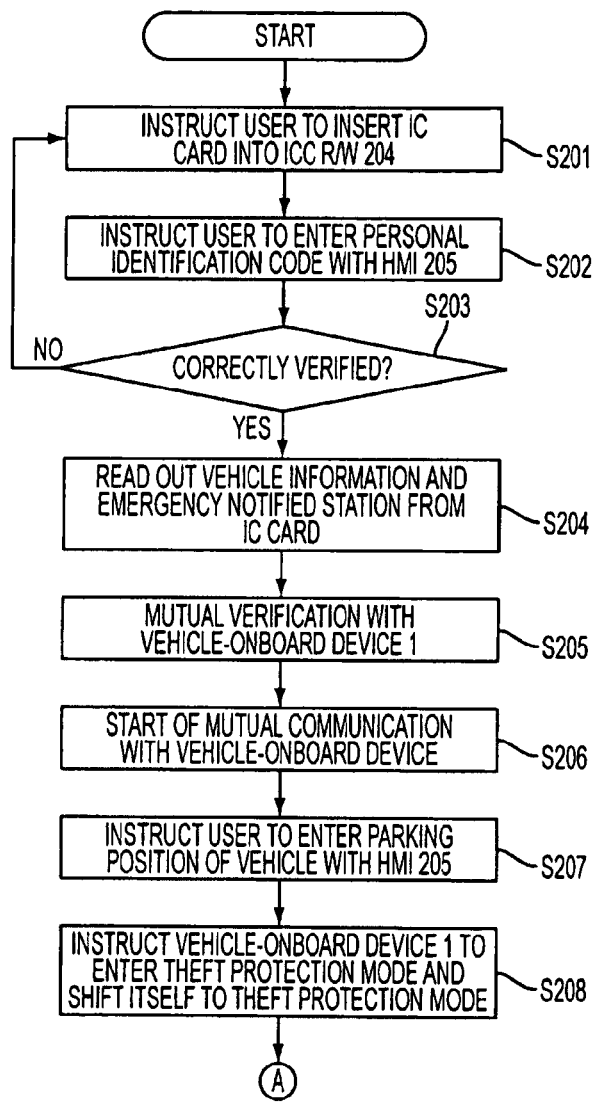
FIGS. 4A–4C depict flow charts illustrating operation of the management station shown in FIG. 2.
Figure 4B:
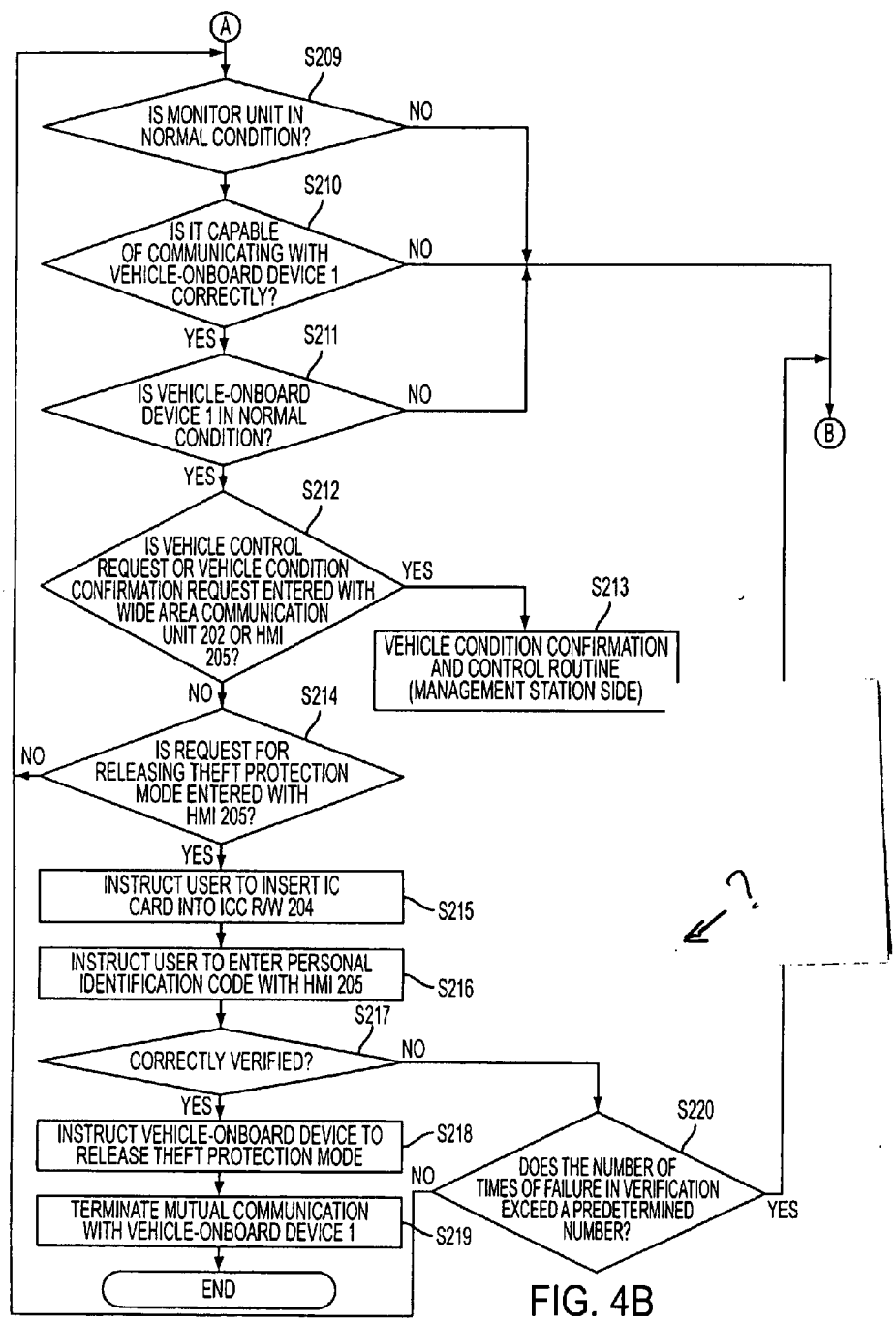
Figure 4C:
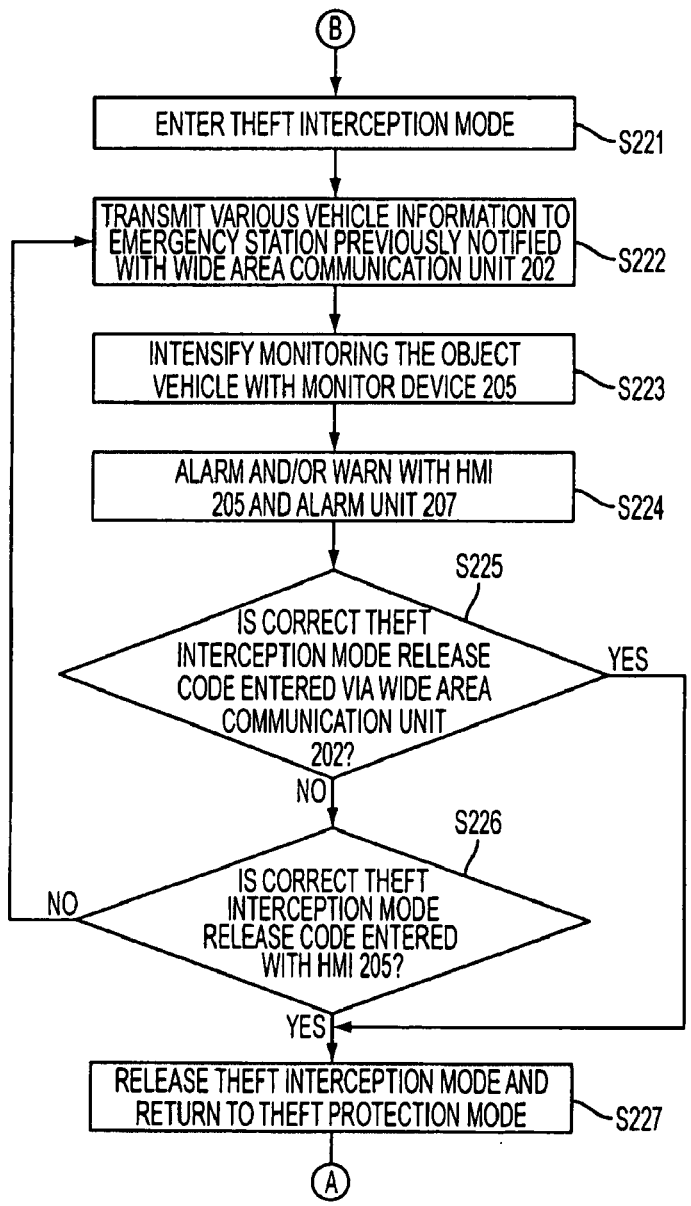

Among the above-described operations, those in steps S402 to S404 are basically the same as op rations in steps S103 to S105 shown in FIG. 3A, and operations in steps S501 to S506 are basically the same as those in steps S201 to S206 shown in FIG. 4A.

(2) Operation After Transient to Theft Protection Modes:

After transient to theft protection modes, vehicle-onboard device 1 and management station 2 confirm the mutual conditions and move to the theft interception modes when any error is detected. Next, operation will be separately described on sides of vehicle-onboard device 1 and management station 2.

(2-a) Operation of Vehicle-onboard Device 1 (Refer to FIGS. 7A–7C):

During execution of the theft protection mode, vehicle-onboard device 1 always confirms whether communication with management station 2 is normal (step S405), and whether the condition of management station 2 is normal (step S406). If any of steps S405 and S406 provides "No", vehicle-onboard device 1 enters the theft interception mode at step S412, and if all steps provide "Yes", processing proceeds to step S407.

In step S407, vehicle-onboard device 1 determines whether management station 2 requests the release of the theft protection mode. If the confirmation is "No", processing returns to step S405, and if the confirmation is "Yes", at step S408, vehicle-onboard device 1 effects verification which is similar to the mutual verification in step S402. If the verification has been done normally, vehicle-onboard device 1 releases the theft protection mode at step S409 and terminates the mutual communication with management station 2 at step S410. The termination of the mutual communication stops the whole operation of this theft protection system, so that the user can move the vehicle.

If the verification has not been done normally in step S408, at step S411, vehicle-onboard device 1 determines whether the number of times of failures in verification exceeds a predetermined number. If "No", processing returns to step S405. If "Yes", processing enters the theft interception mode at step S412.

If the confirmation is "No" in any of steps S405 and 8406, or if the confirmation in step 8411 is "Yes", so that processing enters the theft interception mode in step S412, vehicle-onboard device 1 raises an alarm and/or warning with alarm unit 104, HMI 105. After this, at step S414, vehicle-onboard device 1 determines whether the correct release code for the theft interception mode is applied with HMI 105. If the confirmation is "No", processing returns to step S413. If the confirmation is "Yes", at step S415, vehicle-onboard device 1 releases the theft interception mode and as well returns to the theft protection mode. After this, processing returns to step S405.

(2-b) Operation of Management Station 2 (Refer to FIGS. 8A–8C):

During execution of the theft protection mode, management station 2 always determines whether there is an error in monitor unit 206 (step S509), and whether communication with vehicle-onboard device 1 is normal (step S510). If any of steps S509 and S510 provides "No", management station 2 enters the theft interception mode at step S520, and if both steps S509 and S510 provide "Yes", processing proceeds to step S511.

In step S511, management station 2 determines whether a request for confirming the vehicle condition Is applied through the wide area communication unit 202 or HMI 205. If the confirmation is "Yes", at step S512, the control unit 203 informs the user about the vehicle condition in accordance with the previously set v hide condition confirmation routine. After this, processing proceeds to step S513. If the confirmation is "No", processing directly proceeds to step S513.

In step S513, management station 2 determines whether a request for releasing the theft protection mode is applied through HMI 205. If the confirmation is "No", processing returns to step S509. If the confirmation is "Yes", at step S514, management station 2 instructs the user to insert the IC card into ICC R/W 204. In response to this instruction, when the user inserts the IC card in ICCR/W 204, at step S515, management station 2 instructs the user to enter his personal identification code with HMI 205. In response to this instruction, when the user enters the personal identification code with HMI 205, the management station 2 compares the personal identification code stored in the inserted IC card with the personal identification code entered by the user at step S516. If verification is correctly done by this collation, management station 2 instructs the release of the theft protection mode at step S517 and terminates the mutual communication with vehicle-onboard device 1 at step S518. The termination of the mutual communication stops the whole operation of this theft protection system, so that the user can move the vehicle.

In step S516, if the verification is not correctly executed, management station 2 determines whether the number of times of failures in verification exceeds a predetermined value at step S519. If the determination is "No", processing returns to step S519, and if the determination is "Yes", processing shifts to the theft interception mode at step S520.

If any of steps S509 and S510 provides "No", or if step S519 provides "Yes", so that processing enters the theft interception mode in step S520, management station 2 transmits a notification to the station for emergency notification with wide area wireless communication unit 202 at step S521, intensifies monitoring the vehicle with monitor unit 206 at step S522, and raises an alarm and/or warning with alarm unit 207, HMI 205 at step S523. After this, at step S524, management station 2 determines whether the correct release code of the theft interception mode is applied via the wide area communication unit 202. If the confirmation in step S524 is "No", at step S525, management station 2 determines whether a correct release code of the theft interception mode is applied with HMI 205. If confirmation in step S525 is "No", processing returns to step S521.

If the confirmation in steps S524 or S525 is "Yes", at step S526, management station 2 releases the theft interception mode and as well returns to the theft protection mode. After this, processing returns to the above-described step S509.

Figure 9:
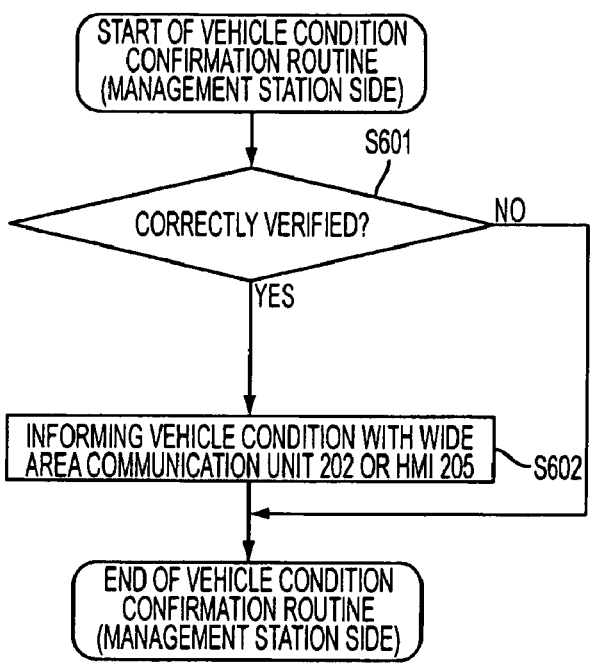
FIG. 9 depicts a flow chart illustrating operation of a vehicle condition confirmation routine executed by the management station shown in FIG. 6.

Next, the vehicle condition confirmation routine in step S512 will be described in detail with reference to FIG. 9.

In this control, first, verification of the user is done in step S601. In this user verification, basically the same process as that for verification in steps S514 to S516 is executed.

If the result of confirmation in step S601 is "Yes", at step S602, management station 2 informs the user about the vehicle condition with the wide area communication unit 202 or HMI 205, and then, terminates the vehicle condition confirmation routine. In the result of confirmation in step S601 is "No", management station 2 immediately terminates the vehicle condition confirmation routine.

Also in the vehicle theft protection system according to the above-described embodiment, like the first embodiment, it is possible to protect false input operation to management station 2 through verification with an IC card, to protect against the pretense of being vehicle-onboard device 1 and management station 2 by mutual verification, to protect from tapping by using the narrow area wireless communication with security, and to detect an error by confirming each other's condition by vehicle-onboard device 1 and management station 2. Thus, vehicle theft can be surely and instantaneously detected.

Further, also in this embodiment, because management station 2 can respond to inquiry of the vehicle condition through wide area communication unit 202, the user can monitor the parked car from a remote location.

In addition, according to this embodiment, because vehicle-onboard device 1 does not include vehicle control device 107, the user cannot control the parked vehicle from a remote location. However, a low cost system is provided by removing the wide area wireless communication unit 102 and various sensor unit 106, and vehicle control unit 107 from the structure of vehicle-onboard device shown in FIG. 2.

In the above-described first and second embodiments, it is also possible that the user enters information necessary for verification at management station 2 instead of verification with the IC card. In this case, the information necessary for verification entered by the user is transmitted to vehicle-onboard device 1 from management station 2, and vehicle-onboard device 1 compares the received information necessary for verification with verification information previously registered.

Third Embodiment

Figure 10:
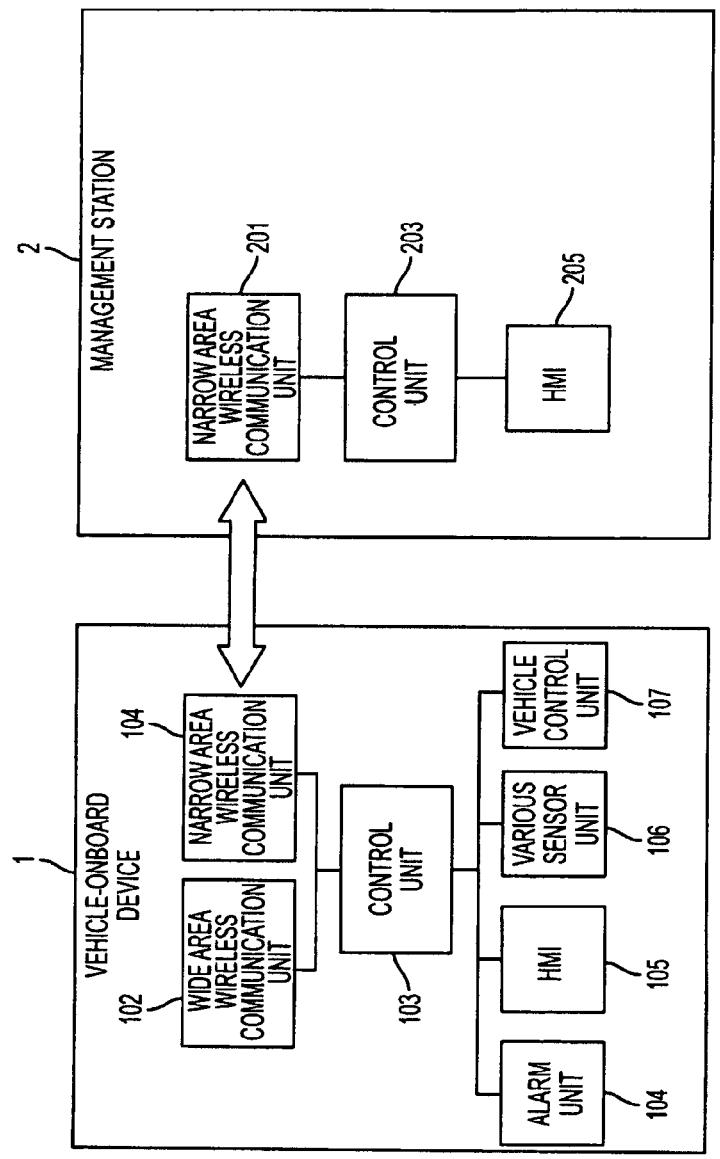
FIG. 10 is a block diagram illustrating a general structure of a vehicle theft protection system according to a third embodiment of the present invention.

FIG. 10 is a block diagram illustrating a general structure of a vehicle theft protection system according to a third embodiment of the present invention. This vehicle theft protection system is obtained by removing wide area communication unit 202, ICC R/W 204, monitor unit 206, and alarm unit 207 from the structure of management station 2 shown in FIG. 2. The same or corresponding elements or parts are designated with like references between FIGS. 2 and 10.

Upon using the vehicle theft protection system according to this embodiment, the user also previously purchases vehicle-onboard device 1 from a contractor managing this system, but does not obtain an IC card. In each of vehicle-onboard device 1 and management station 2, information necessary for the mutual verification and the mutual communication by the narrow wireless communication with security (vehicle information or the like) and emergency notified station information (e.g., a telephone number and mail address of a user, a telephone number and mail address of a security firm) are previously registered. The users mounts vehicle-onboard device 1 on his own vehicle enables to use this vehicle theft protection system.

Figure 11A:
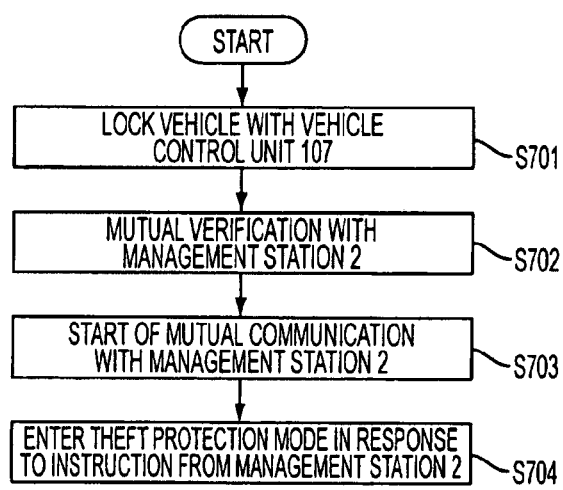
FIGS. 11A–11C depict flow charts illustrating operation of the vehicle-onboard device shown in FIG. 10.
Figure 11B:
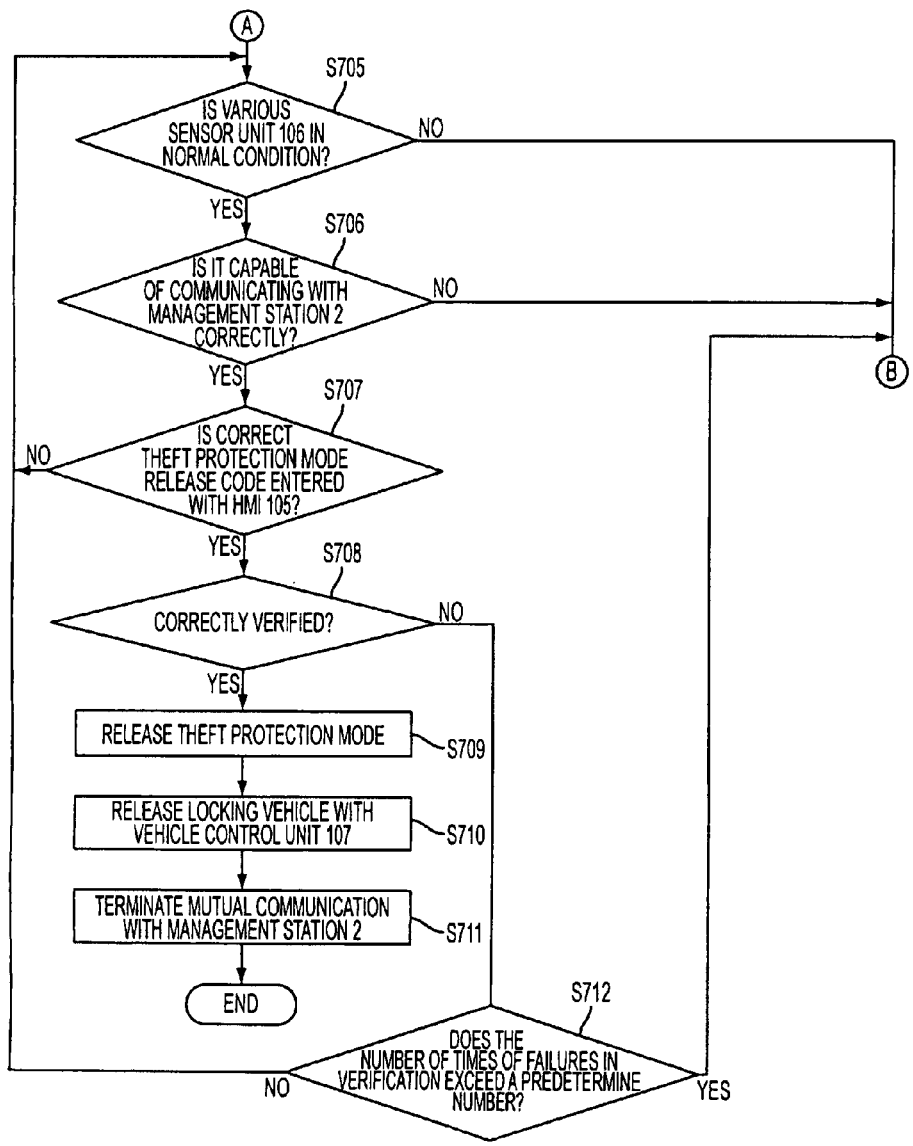
Figure 11C:
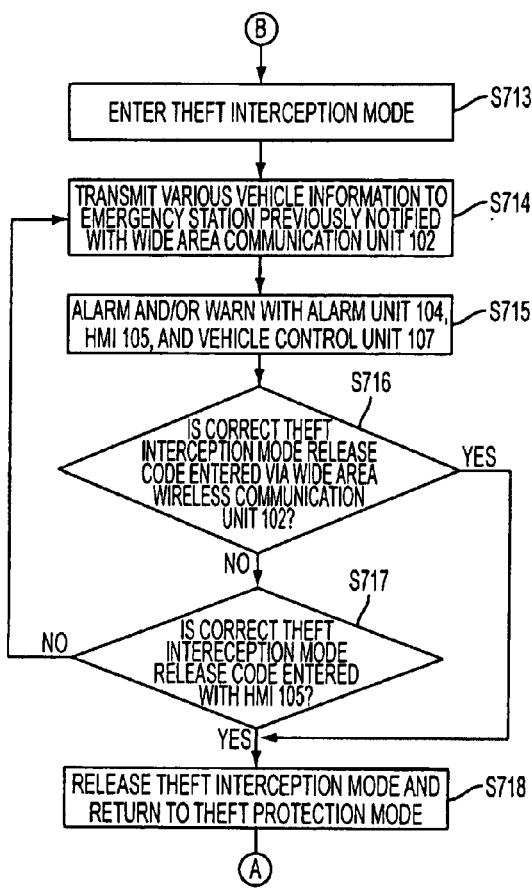
Figure 12A:
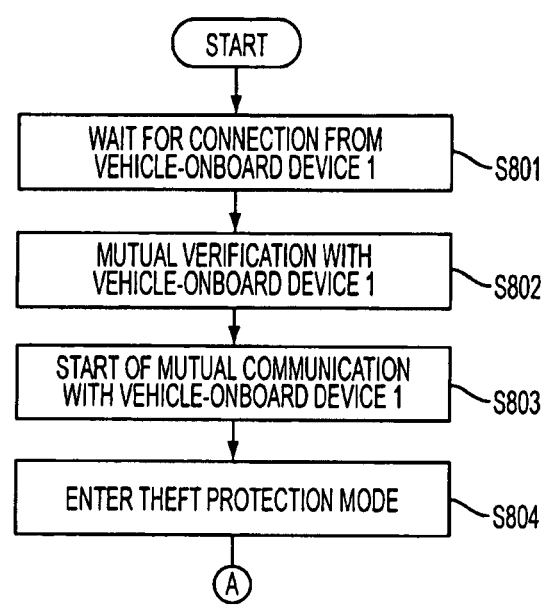
FIGS. 12A–12C depict flow charts illustrating operation of the management station shown in FIG. 10.
Figure 12B:
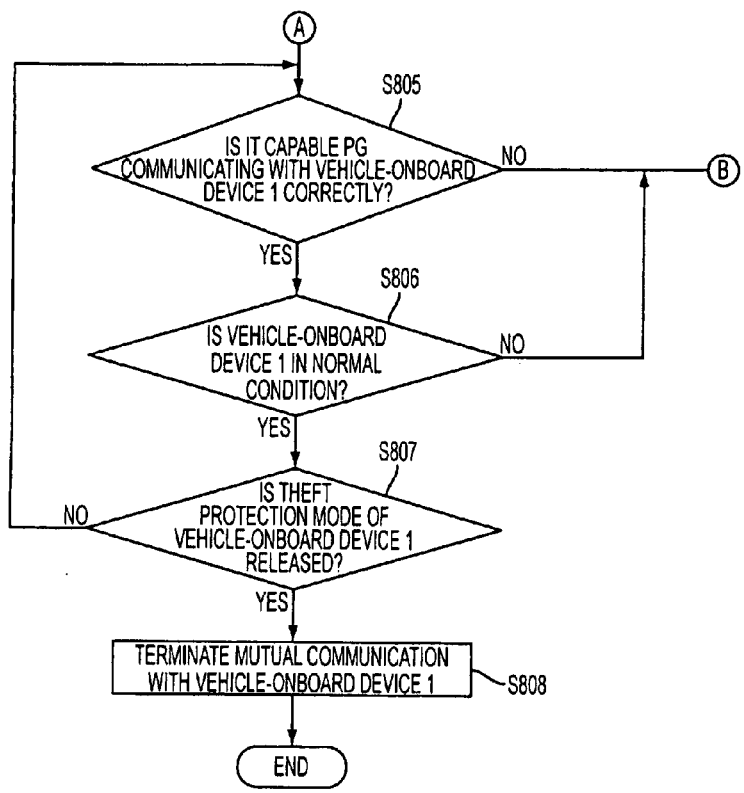
Figure 12C:
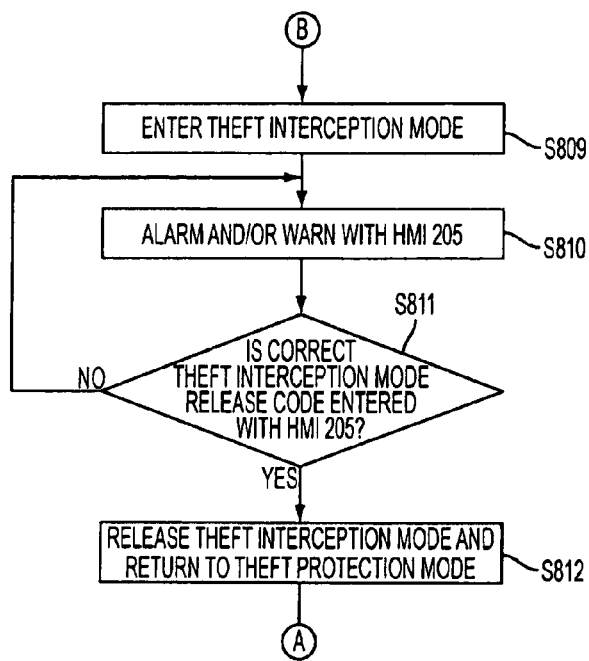

FIG. 11A–11C depict flow charts illustrating operation of vehicle-onboard device 1, FIGS. 12A–12C depict flow charts illustrating operation of management station 2. Operation of the vehicle theft protection system according to the embodiment will be described in detail with reference to FIGS. 11A–11C and 12A–12C.

(1) Operation in Transit to Theft Protection Mode Via the Mutual Verification:

After activation, management station 2 enters a standby condition waiting for connection from vehicle-onboard device 1 (step S801). When the user parks the vehicle on the parking area, vehicle-onboard device 1 is activated in response to an instruction by the user or activated in accordance with its own judgment in response to variation of a vehicle condition and locks the vehicle (step S701). After this, vehicle-onboard device 1 starts communication with management station 2, which is entered into a standby condition waiting for connection in step S801, via narrow area wireless communication unit 101. Upon start of this communication between vehicle-onboard device 1 and management station 2, verification information included in vehicle information which had been set on purchase is exchanged. The mutual verification is effected on the basis of the exchanged verification information (steps S702, S802). After verification both vehicle-onboard device 1 and management station 2 enter the regular mutual communication condition with security (steps S703 and S803). After start of the mutual communication, both vehicle-onboard device 1 and management station 2 enter the theft protection mode (steps S704 and S804).

(2) Operation After Transit to Theft Protection Modes

After transient to theft protection modes, vehicle-onboard device 1 and management station 2 confirm the mutual conditions and shift to the theft interception modes when any error is detected. Next, operation will be separately described on sides of vehicle-onboard device 1 and management station 2.

(2-a) Operation of Vehicle-onboard Device 1 (Refer to FIGS. 11A–11C)

During execution of the theft protection mode, vehicle-onboard device 1 always confirms whether there is any error in various sensor unit 106 (step S705), and whether communication with management station 2 is normal (step S706). If the result is "No" in either step S705 or S706, vehicle-onboard device 1 enters the theft interception mode at step S713, and if results are "Yes" in all steps, processing proceeds to step S707.

In step 8707, vehicle-onboard device 1 determines whether the correct release code of the theft protection mode is applied with HMI 105. The release code is previously registered in vehicle-onboard device 1, and thus, vehicle-onboard device 1 determines whether the entered code is true by comparing the release code entered with HMI 105 with the registered release code. If the result is "No", processing returns to step S705. If the result is "Yes", vehicle-onboard device 1 effects verification of the user at step S708. During this verification, for example, the user is requested to enter his own personal identification code. In response to this request, the user enters the personal identification code with HMI 105, vehicle-onboard devices 1 compares the previously registered personal identification code with the personal identification code entered by the user. If the verification is correctly executed, vehicle-onboard device 1 releases theft protection mode at step S709, releases locking the vehicle by the vehicle control unit 107 at step S710, and terminates the mutual communication with management station 2 at step S711. The termination of the mutual communication stops the whole operation of this theft protection system, so that the user can move the vehicle.

In step S708, the verification is not correctly executed, at step S712, vehicle-onboard device 1 determines whether the number of times of failures in verification exceeds a predetermined value. If the result is "No", processing returns to step S705, and if the result is "Yes", processing enters the theft interception mode at step S713.

If the result is "No" in any step of steps S705 and S706, or if the result in step S712 is "Yes", and thus processing shifts to th theft interception mode in step S117, vehicle-onboard device 1 transmits a notification to the station previously registered as an emergency notification with wide area wireless communication unit 102 at step S714 and raises an alarm and/or warning with alarm unit 104, HMI 105, and vehicle control unit 107 at step S715. After this, at step S716, vehicle-onboard device 1 determines whether the correct release code of the theft interception mode is entered via the wide area wireless communication unit 102. If the result of this confirmation is "No", at step S717, vehicle-onboard device 1 determines whether a correct release code of the theft interception mode is entered with HMI 105. If the result of this confirmation is "No", processing returns to step S714.

If the results in steps S716 and S717 are "Yes", at step S718, vehicle-onboard device 1 releases the theft interception mode in step S718 and as well returns to the theft protection mode. Then, processing returns to step S705.

(2-b) Operation of Management Station 2 (Refer to FIGS. 12A–12C):

During execution of the theft protection mode, management station 2 always determines whether communication with vehicle-onboard device 1 is normal (step S805), and whether the condition of vehicle-onboard device 1 is normal (step S806). If the result is "No" in either step S805 or S806, management station 2 enters the theft interception mode at step S221, and if results are "Yes" in all steps, processing proceeds to step S807.

In step S807, management station 2 determines whether the theft protection mode is released in vehicle-onboard device 1. If the result is "No", processing returns to step S805, if the result is "Yes", management station 2 terminates this mutual communication at step S808. The termination of the mutual communication stops the whole operation of this theft protection system, so that the user can move the vehicle.

After transition to the theft interception mode in step S809, at step S810, management station 2 effects an alarm and notification with HMI 205. After this, at step S811, management station 2 determines whether the correct release code of the theft interception mode is applied via the wide area communication unit 202. If the result of this confirmation is "No", processing returns to step S810. If the result is "Yes", at step S812, management station 2 releases the theft interception mode and as well returns to the theft protection mode. Then, processing returns to step S805.

Also in the vehicle theft protection system according to the above-described embodiment, like the first and second embodiments, it is possible to protect against the pretense of being vehicle-onboard device 1 and management station 2 by mutual verification, to protect tapping by using the narrow area wireless communication with security, and to detect an error by confirming each other's condition by vehicle-onboard device 1 and management station 2. Thus, vehicle theft can be surely and instantaneously detected.

Figure 1:
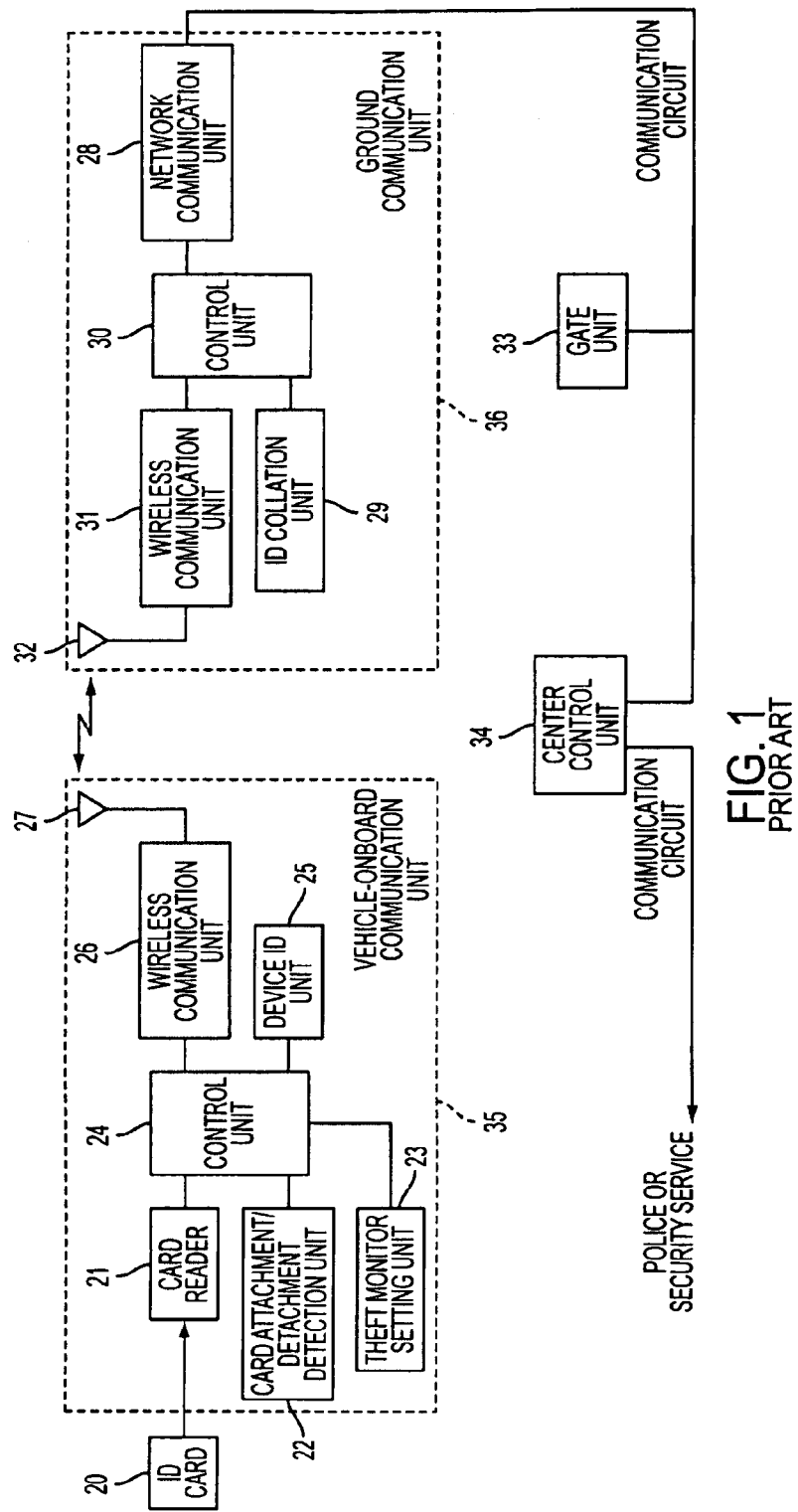
FIG. 1 is a block diagram illustrating a general structure of a parking area management system disclosed in Japanese Laid-Open patent application publication No. 2002-342897.

In addition, according to the composition of this embodiment, since wide area communication unit 202, ICC R/W 204, monitor unit 206, and alarm unit 207 are removed from the structure of management station 2 shown in FIG. 1, a low cost system may be provided.

In the vehicle theft protection system according to each of the embodiments, adopting RF-ID tags as the narrow area wireless communication unit simply provides unified management of information regarding business hours of the park and vehicle. More specifically, for example, an RF-ID tag reader is used as narrow area wireless communication unit 101 of vehicle-onboard device 1, and an RF-ID tag is used as narrow area wireless communication unit 201 of management station 2. Alternatively, an RF-ID tag reader is used as narrow area wireless communication unit 201 of management station 2, and an RF-ID tag is used as narrow area wireless communication unit 101 of vehicle-onboard device 1. In the RF-ID tag, vehicle information, for example, information necessary for the mutual verification and the mutual communication and the station for emergency notification of information is previously registered as tag data.

Vehicle-onboard device 1 and management station 2 each include a memory device for storing programs in advance, and thus, computers included therein execute programs read from the memory devices to conduct the operations described in respective first to third embodiments (FIGS. 3–4, 6–8, 10, and 11). For these memory devices, various memory devices are usable such as CD-ROM disc and its drive and semiconductor memory devices.

Narrow area communication unit 201 may have a communication area corresponding to a parking area for parking a predetermined number of vehicles. In this case, narrow area wireless communication unit 201 comprises an antenna and a transceiver circuit connectable to the antenna to provide a communicable area which is smaller than the parking area, and a plurality of antennas are arranged to have a total communication area corresponding to the parking area. Further, narrow area wireless communication 201 may have a communication area corresponding to a park space of each vehicle.

While preferred embodiments of the present invention have been described using specific terms, such description is for illustrative purposes only, and it is to be understood that changes and variations may be made without departing from the spirit or scope of the following claims.

What is claimed is:

1. A vehicle theft protecting system comprising:
   a vehicle-onboard device to be mounted on a vehicle; and
   a management station to be installed at a predetermined location, wherein each of said vehicle-onboard device and said management station comprise narrow area wireless communication means capable of communication with encryption in a range of a predetermined distance, and said narrow area wireless communication means of said vehicle-onboard device and said management station effect repeated mutual communication to monitor each other's condition,
   wherein at least one of said management station and said vehicle-onboard device detects theft of said vehicle based on a breakdown of said repeated mutual communication between the vehicle-onboard device and the management station.

2. The vehicle theft protecting system as claimed in claim 1, wherein said vehicle-onboard device and said management station effect mutual verification through said narrow area wireless communication means of said vehicle-onboard device and said management station at start of said mutual communication.

3. The vehicle theft protecting system as claimed in claim 2,
   wherein said management station includes information reading means for reading out information from an IC card storing at least first mutual verification information necessary for said mutual verification,
   wherein during said mutual verification, said management station transmits said first mutual verification information read out with said information reading means from said IC card to said vehicle-onboard device with said narrow area wireless communication means and compares second mutual verification information, corresponding to said first mutual verification information, received from said vehicle-onboard device through said narrow area wireless communication means with said read first mutual verification information, and wherein said second mutual verification information is previously registered in said vehicle-onboard device, and during said mutual verification, said vehicle-onboard device transmits said registered second mutual verification information to said management station with said narrow area wireless communication means thereof and compares said first mutual verification information received from said management station through said narrow area wireless communication means with said registered second mutual verification information.

4. The vehicle theft protecting system as claimed in claim 3,
wherein said IC card further stores first user verification information necessary for verification of a user using said vehicle-onboard device, and
wherein second user verification information corresponding to said first user verification information is previously registered in said management station, upon start of said mutual communication, said management station reads out said first user verification information from said IC card with said information reading means and compares said first user information from said IC card with said registered second user verification information.

5. The vehicle theft protecting system as claimed in claim 1, wherein said vehicle-onboard device further includes said wide area wireless communication means of which communicable distance is larger than that of said narrow area wireless communication means thereof, when an error is detected during monitoring said each other's condition through said mutual communication, said vehicle-onboard device transmits a notice of detection of said error with said wide area wireless communication means.

6. The vehicle theft protecting system as claimed in claim 1, wherein said vehicle-onboard device further includes alarming means for alarming, and when an error is detected during monitoring each other's condition through said mutual communication, said vehicle-onboard device activates said alarming means.

7. The vehicle theft protecting system as claimed in claim 1, wherein said management station further includes said wide area communication means of which communicable distance is larger than that of said narrow area wireless communication means thereof, when an error is detected during monitoring said each other's condition through said mutual communication, said management station transmits a notice of detection of said error with said wide area communication means.

8. The vehicle theft protecting system as claimed in claim 7, wherein when a request for confirming a condition of said vehicle is provided said wide area communication means to said management station, said management station transmits said condition of said vehicle with said wide area communication means in response to said request.

9. The vehicle theft protecting system as claimed in claim 7,
wherein when a request for controlling said vehicle is provided through said wide area communication means, said management station requests said vehicle-onboard device to control said vehicle through said narrow area wireless communication means in response to said request, and
wherein said vehicle-onboard device further includes vehicle controlling means for controlling a predetermined operation of said vehicle, and controls said vehicle with said vehicle controlling means in response to said request from said management station.

10. A method of protecting a vehicle from theft, comprising the steps of:
effecting repeated mutual communication between a vehicle-onboard device mounted on a vehicle and a management station installed at a predetermined location through narrow area wireless communication capable of encrypted communication in a range of a predetermined distance;
monitoring mutual conditions of said vehicle-onboard device and said management station by said mutual communication; and
detecting theft of said vehicle by at least one of said management station and said vehicle-onboard device based on a breakdown of said repeated mutual communication between the vehicle-onboard device and said management station.

11. The method of protecting a vehicle from theft as claimed in claim 10, the method further comprising the step of effecting mutual verification between said vehicle-onboard device and said management station through said narrow area wireless communication at start of said mutual communication.

12. The method of protecting a vehicle from theft as claimed in claim 11, the method further comprising the steps of:
reading out first mutual verification information necessary for said mutual verification from an IC card and transmitting said read first mutual verification information to said vehicle-onboard device through said narrow area wireless communication, by said management station;
transmitting, to said management station through said narrow area wireless communication, previously registered second mutual verification information corresponding to said first mutual verification information, by said vehicle-onboard device;
comparing said second mutual verification information received from said vehicle-onboard device with said first mutual verification information read out from said IC card, by said management station; and
comparing said first mutual verification information received from said management station with said registered second mutual verification information, by said vehicle-onboard device.

13. The method of protecting a vehicle from theft as claimed in claim 12, the method further comprising the step of:
on start of said mutual communication, reading out from said IC card first user verification information necessary for verification of a user employing said vehicle-onboard device and comparing said read first user verification information with previously registered second user verification information corresponding to said first user verification information, by said management station.

14. The method of protecting a vehicle from theft as claimed in claim 10, the method further comprising the step of:
when an error is detected during monitoring the mutual condition through said mutual communication, informing of a notice of detection of said error by said vehicle-onboard device through wide area wireless communication of which communicable distance is larger than that of said narrow area wireless communication.

15. The method of protecting a vehicle from theft as claimed in claim 10, further comprising the step of:
effecting a predetermined alarming operation by said vehicle-onboard device when an error is detected during monitoring the mutual condition through said mutual communication.

16. The method of protecting a vehicle from theft as claimed in claim 10, further comprising the step of:
when an error is detected during monitoring the mutual conditions through said mutual communication, informing of a notice of detection of said error by said management station through said wide area wireless communication of which communicable distance is larger than that of said narrow area wireless communication.

17. The method of protecting a vehicle from theft as claimed in claim 16, further comprising the step of:
when a request for confirming the condition of said vehicle is provided through said wide area wireless communication to said management station, informing of the condition of said vehicle by said management station through said wide area wireless communication in response to said request.

18. The method of protecting a vehicle from theft as claimed in claim 17, further comprising the steps of:
when a request for controlling said vehicle is provided through said wide area wireless communication to said management station, requesting said vehicle-onboard device to control said vehicle through said narrow area wireless communication in response to said request by said management station, and
controlling a predetermined operation of said vehicle by said vehicle-onboard device in response to said request from said management station.

19. A program used in a system comprising a vehicle-onboard device with a computer mounted on a vehicle and a management station with a computer installed at a predetermined location, said program comprising:
a process for effecting repeated mutual communication between said vehicle-onboard device mounted on said vehicle and said management station through narrow area wireless communication capable of encrypted communication in a range of a predetermined distance;
a process for mutually monitoring conditions of said vehicle-onboard device and said management station through said mutual communication, said processes being executed by said computers of said vehicle-onboard device and said management station, respectively; and
a process, executed by at least one of said computer of said vehicle-onboard device and said computer of said management station, for detecting theft of said vehicle based on a breakdown of said repeated mutual communication between the vehicle-onboard device and said management station.

20. A program as claimed in claim 19, further comprising a process, executed by said computers of said vehicle-onboard device and said management station, for effecting mutual verification between said vehicle-onboard device and said management station through said narrow area wireless communication at start of said mutual communication.

21. The program as claimed in claim 20, further comprising:
a process, executed by said computer of said management station, for reading out first mutual verification information necessary for said mutual verification from an IC card and transmitting said read first mutual verification information to said vehicle-onboard device through said narrow area wireless communication;
a process, executed by said computer of said vehicle-onboard device, for transmitting, to said management station through said narrow area wireless communication, previously registered second mutual verification information corresponding to said first mutual verification information;
a process, executed by said computer of said management station, for comparing said second mutual verification information received from said vehicle-onboard device with said first mutual verification information read out from said IC card; and
a process, executed by said computer of said vehicle-onboard device, for comparing said first mutual verification information received from said management station with said registered second mutual verification information.

22. The program as claimed in claim 19, further comprising:
a process, executed by said computer of said management station, for, on start of said mutual communication, reading out, from said IC card, first user verification information necessary for verification of a user employing said vehicle-onboard device and comparing said read first user verification information with previously registered second user verification information corresponding to said first user verification information.

23. The program as claimed in claim 19, further comprising:
a process, executed by said computer of said vehicle-onboard device, for, when an error is detected during monitoring the mutual condition through said mutual communication, informing a notice of detection of said error through said wide area wireless communication of which communicable distance is larger than that of said narrow area wireless communication.

24. The program as claimed in claim 19, further comprising:
a process, executed by said computer of said vehicle-onboard device, for effecting a predetermined alarming operation when an error is detected during monitoring the mutual condition through said mutual communication.

25. The program as claimed in claim 19, further comprising:
a process, executed by said computer of said management station, for, when an error is detected during monitoring the mutual condition through said mutual communication, informing of a notice of detecting said error through said wide area wireless communication.

26. The program as claimed in claim 25, further comprising:
a process, executed by said computer of said management station, for, when a request for confirming the condition of said vehicle is provided through said wide area wireless communication to said management station, informing of the condition of said vehicle through said wide area wireless communication in response to said request.

27. The program as claimed in claim 26, further comprising:
a process, executed by said computer of said management station, for, when a request for controlling said vehicle is provided through said wide area wireless communication to said management station, requesting said vehicle-onboard device to control said vehicle through said narrow area wireless communication in response to said request, and a process, executed by said computer of said vehicle-onboard device, for controlling a predetermined operation of said vehicle in response to said request from said management station.

28. A management station comprising:

narrow area wireless communication means for encryption-communicating with a vehicle-onboard device on a vehicle in a range of a predetermined distance; and control means for effecting repeated mutual communication with said vehicle-onboard device with said narrow area wireless communication means to monitor each other's condition; and wherein at least one of said management station and said vehicle-onboard device detects theft of said vehicle based on a breakdown of said repeated mutual communication between the vehicle-onboard device and the management station.

29. The management station as claimed in claim 28, wherein said control means effects mutual verification through said narrow area wireless communication means at start of said mutual communication.

30. The management station as claimed in claim 29, further comprising information reading means for reading out information from an IC card storing at least first mutual verification information necessary for said mutual verification, wherein during said mutual verification, said management station transmits said first mutual verification information read out with said information reading means from said IC card to said vehicle-onboard device with said narrow area wireless communication means and compares second mutual verification information, corresponding to said first mutual verification information, received from said vehicle-onboard device through said narrow area wireless communication means with said read first mutual verification information.

31. The management station as claimed in claim 30, wherein said IC card stores first user verification information necessary for verification of a user employing said vehicle-onboard device, and wherein second user verification information, corresponding to said first user verification information, is previously registered in said control means, upon start of said mutual communication, said control means compares said first user verification information read out from said IC card using said information reading means with said registered second user verification information corresponding to said first user verification information.

32. The management station as claimed in claim 28, further comprising wide area communication means of which communicable distance is larger than that of said narrow area wireless communication means, when an error is detected during monitoring said each other's condition through said mutual communication, said control means transmits a notice of detection of said error with said wide area communication means.

33. The management station as claimed in claim 32, wherein when a request for confirming a condition of said vehicle is provided through said wide area communication means to said management station, said control means informs of said condition of said vehicle with said wide area communication means in response to said request.

34. The management station as claimed in claim 32, wherein when a request for controlling said vehicle is provided through said wide area communication means to said management station, said control means requests said vehicle-onboard device to control said vehicle through said narrow area wireless communication means in response to said request.

35. A vehicle-onboard device mounted on a vehicle, comprising:

narrow area wireless communication means capable of encrypted communication with a management station in a range of a predetermined distance; and control means for effecting repeated mutual communication with said management station to monitor each other's condition; and wherein at least one of said management station and said vehicle-onboard device detects theft of said vehicle based on a breakdown of said repeated mutual communication between the vehicle-onboard device and the management station.

36. The vehicle-onboard device as claimed in claim 35, wherein said control means effects mutual verification through said narrow area wireless communication means at start of said mutual communication.

37. The vehicle-onboard device as claimed in claim 36, wherein during said mutual verification, said control means transmits previously registered first mutual verification information to said management station with said narrow area wireless communication means and compares second mutual verification information, corresponding to said first mutual verification information, received from said management station through said narrow area wireless communication means with said registered first mutual verification information.

38. The vehicle-onboard device as claimed in claim 35, further comprising wide area wireless communication means of which communicable distance is larger than that of said narrow area wireless communication means, wherein when an error is detected during monitoring said each other's condition through said mutual communication, said control means transmits a notice of detection of said error with said wide area wireless communication means.

39. The vehicle-onboard device as claimed in claim 35, further comprising alarming means for alarming, and when an error is detected during monitoring each other's condition through said mutual communication, said control means activates said alarming means.

40. A vehicle-onboard device as claimed in claim 35, further comprising vehicle controlling means for controlling a predetermined operation of said vehicle, and controlling said vehicle with said vehicle controlling means in response to a request from said management station.

* * * * *